(12) United States Patent
Hiroe

(10) Patent No.: US 12,148,432 B2
(45) Date of Patent: Nov. 19, 2024

(54) SIGNAL PROCESSING DEVICE, SIGNAL PROCESSING METHOD, AND SIGNAL PROCESSING SYSTEM

(71) Applicant: SONY GROUP CORPORATION, Tokyo (JP)

(72) Inventor: Atsuo Hiroe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 217 days.

(21) Appl. No.: 17/756,874

(22) PCT Filed: Dec. 10, 2020

(86) PCT No.: PCT/JP2020/046023
§ 371 (c)(1),
(2) Date: Jun. 3, 2022

(87) PCT Pub. No.: WO2021/125037
PCT Pub. Date: Jun. 24, 2021

(65) Prior Publication Data
US 2023/0005488 A1   Jan. 5, 2023

(30) Foreign Application Priority Data

Dec. 17, 2019   (JP) ................. 2019-227192

(51) Int. Cl.
*G10L 25/78*   (2013.01)
*G10L 17/18*   (2013.01)
(Continued)

(52) U.S. Cl.
CPC ............ *G10L 17/18* (2013.01); *G10L 21/034* (2013.01); *G10L 25/78* (2013.01); *H04R 1/406* (2013.01); *H04R 3/005* (2013.01)

(58) Field of Classification Search
CPC ................. G10L 25/78; G10L 21/0272; G10L 2021/02165
See application file for complete search history.

(56) References Cited

U.S. PATENT DOCUMENTS 10,157,629 B2 * 12/2018 van der Made ......... G06N 3/10
2011/0099010 A1 *  4/2011 Zhang .................... G10L 25/78
704/E15.001

(Continued)

FOREIGN PATENT DOCUMENTS

CN   102388416 A   3/2012
CN   107851443 A   3/2018
(Continued)

OTHER PUBLICATIONS

International Search Report and Written Opinion of PCT Application No. PCT/JP2020/046023, issued on Mar. 2, 2021, 09 pages of ISRWO.

*Primary Examiner* — Feng-Tzer Tzeng
(74) *Attorney, Agent, or Firm* — CHIP LAW GROUP

(57) ABSTRACT

Provided is a signal processing device including a main speech detection unit that detects, by using a neural network, whether or not a signal input to a sound collection device assigned to each of at least two speakers includes a main speech that is a voice of the corresponding speaker, and outputs frame information indicating presence or absence of the main speech.

12 Claims, 25 Drawing Sheets

(51) Int. Cl.
   *G10L 21/034* (2013.01)
   *H04R 1/40* (2006.01)
   *H04R 3/00* (2006.01)

(56) References Cited

U.S. PATENT DOCUMENTS

| | | |
|---|---|---|
| 2012/0020505 A1 | 1/2012 | Yamada et al. |
| 2013/0289982 A1 | 10/2013 | Yamada et al. |
| 2014/0012576 A1 | 1/2014 | Yamada et al. |
| 2017/0092297 A1 | 3/2017 | Sainath et al. |
| 2019/0341057 A1 | 11/2019 | Zhang et al. |

FOREIGN PATENT DOCUMENTS

| | | | | |
|---|---|---|---|---|
| EP | 2058797 B1 | * | 5/2011 | ............ G10L 25/78 |
| EP | 2541543 A1 | | 1/2013 | |
| EP | 3347896 A1 | | 7/2018 | |
| JP | 2005-129971 A | | 5/2005 | |
| JP | 2006-039108 A | | 2/2006 | |
| JP | 2006-301223 A | | 11/2006 | |
| JP | 2006343642 A | * | 12/2006 | |
| JP | 2007-133033 A | | 5/2007 | |
| JP | 2008-009693 A | | 1/2008 | |
| JP | 4182444 B2 | | 11/2008 | |
| JP | 2018-005122 A | | 1/2018 | |
| JP | 2018-517928 A | | 7/2018 | |
| KR | 20100115033 A | * | 4/2009 | |
| KR | 10-2017-0133459 A | | 12/2017 | |
| WO | 2011/105003 A1 | | 9/2011 | |
| WO | 2017/052739 A1 | | 3/2017 | |
| WO | 2019/217134 A1 | | 11/2019 | |
| WO | WO-2021139425 A1 | * | 7/2021 | ............ G10L 25/18 |

* cited by examiner

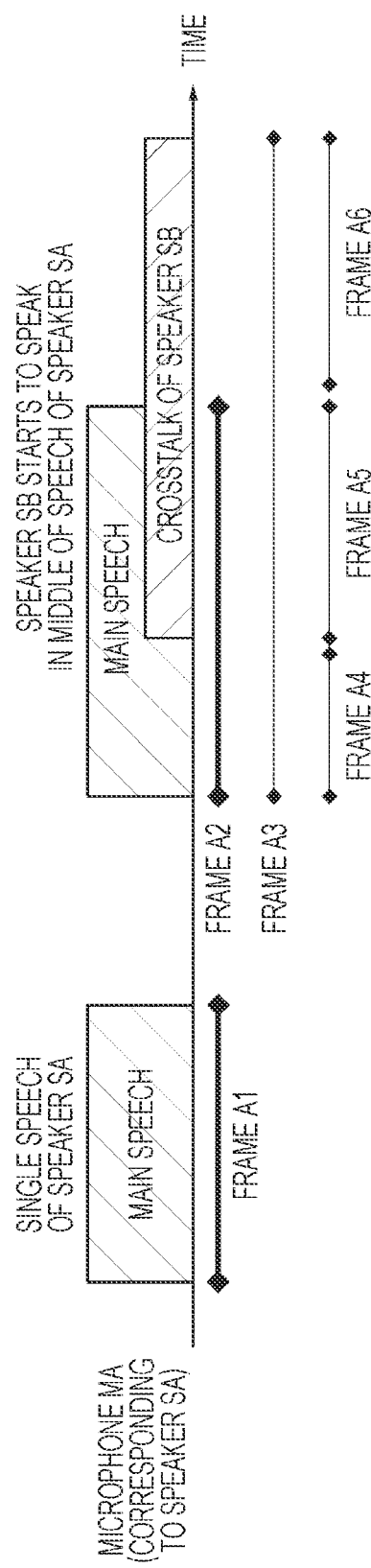
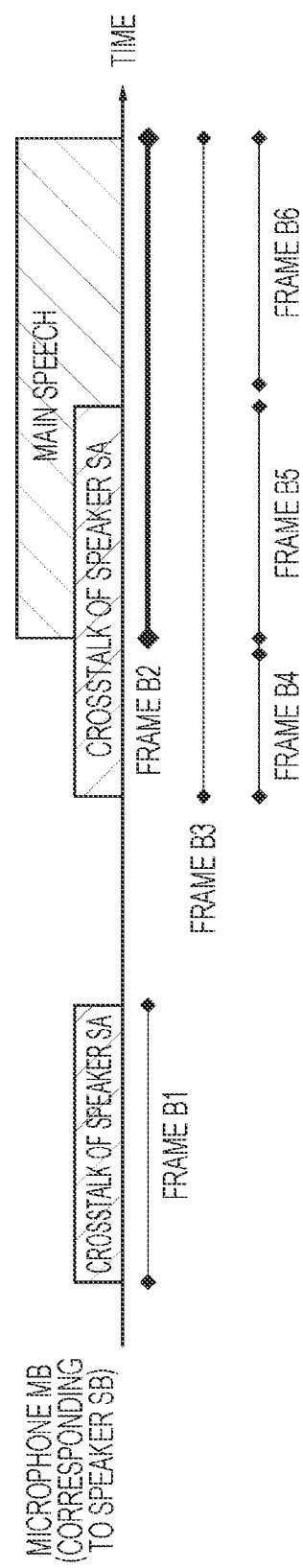
FIG. 2A
FIG. 2B

FIG. 4A

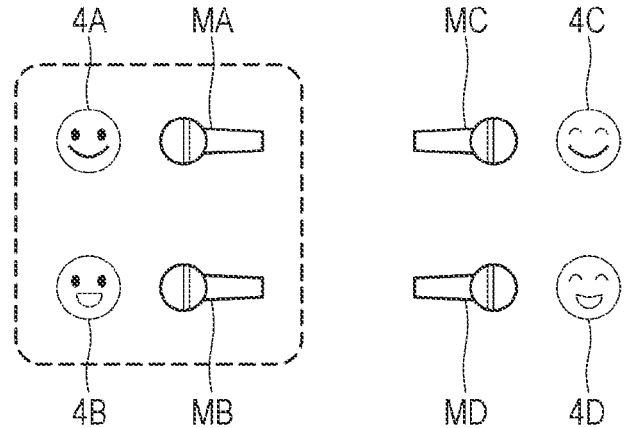

FIG. 4B

| SPEAKER'S STATE | | | INPUT DATA | | TEACHER LABEL | |
|---|---|---|---|---|---|---|
| SPEAKER 4A | SPEAKER 4B | OTHER SPEAKERS | MICROPHONE MA | MICROPHONE MB | MICROPHONE MA | MICROPHONE MB |
| SPEAKING | SPEAKING | SPEAKING | Ad+Bc+Oc | Ac+Bd+Oc | 1 | 1 |
| SPEAKING | SPEAKING | | Ad+Bc | Ac+Bd | 1 | 1 |
| SPEAKING | | SPEAKING | Ad+Oc | Ac+Oc | 1 | 0 |
| SPEAKING | | | Ad | Ac | 1 | 0 |
| | SPEAKING | SPEAKING | Bc+Oc | Bd+Oc | 0 | 1 |
| | SPEAKING | | Bc | Bd | 0 | 1 |
| | | SPEAKING | Oc | Oc | 0 | 0 |
| | | | SILENCE | SILENCE | 0 | 0 |

A: SPEAKER 4A
B: SPEAKER 4B
O: OTHER SPEAKERS
d: MAIN SPEECH
c: CROSSTALK

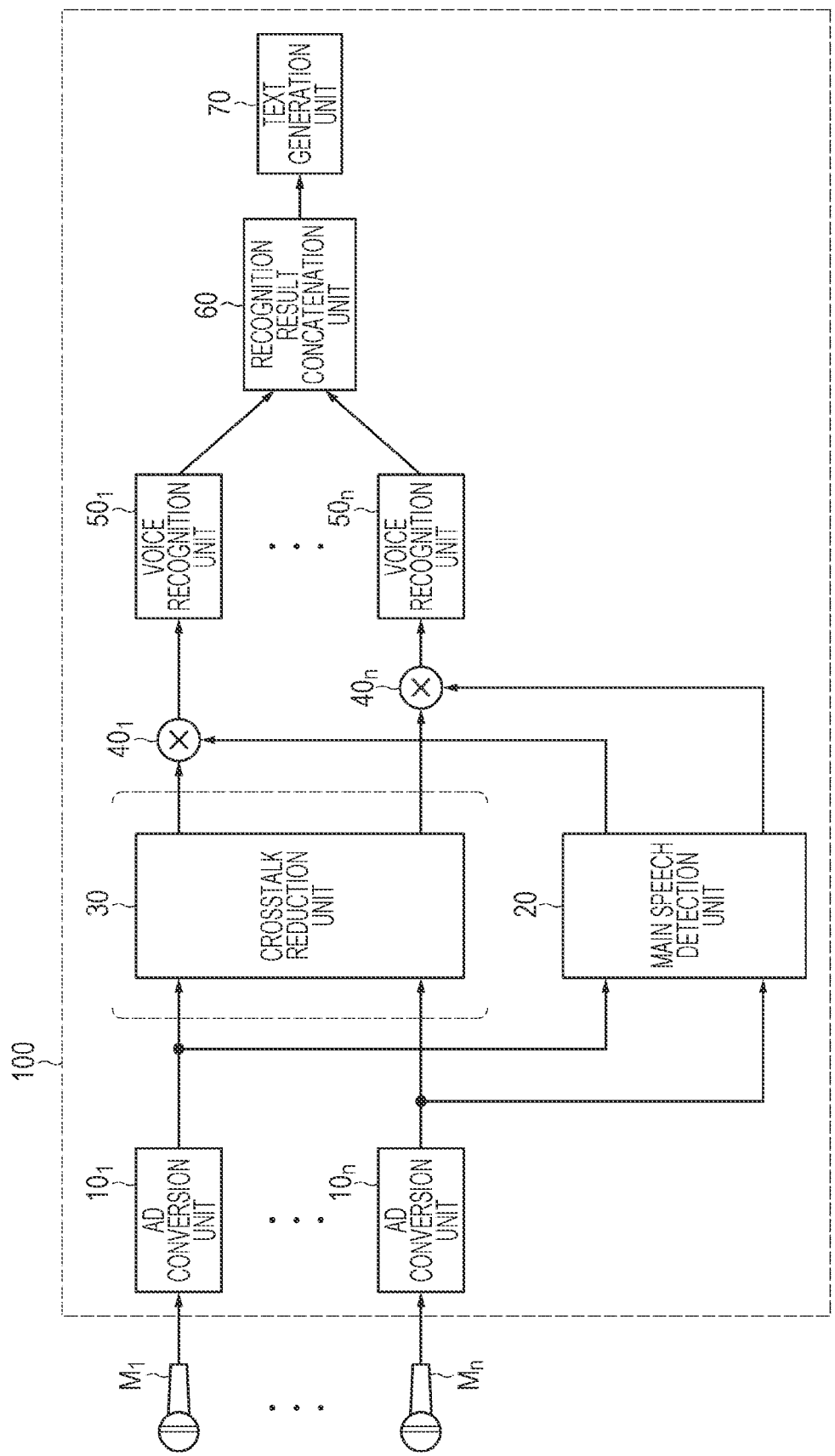

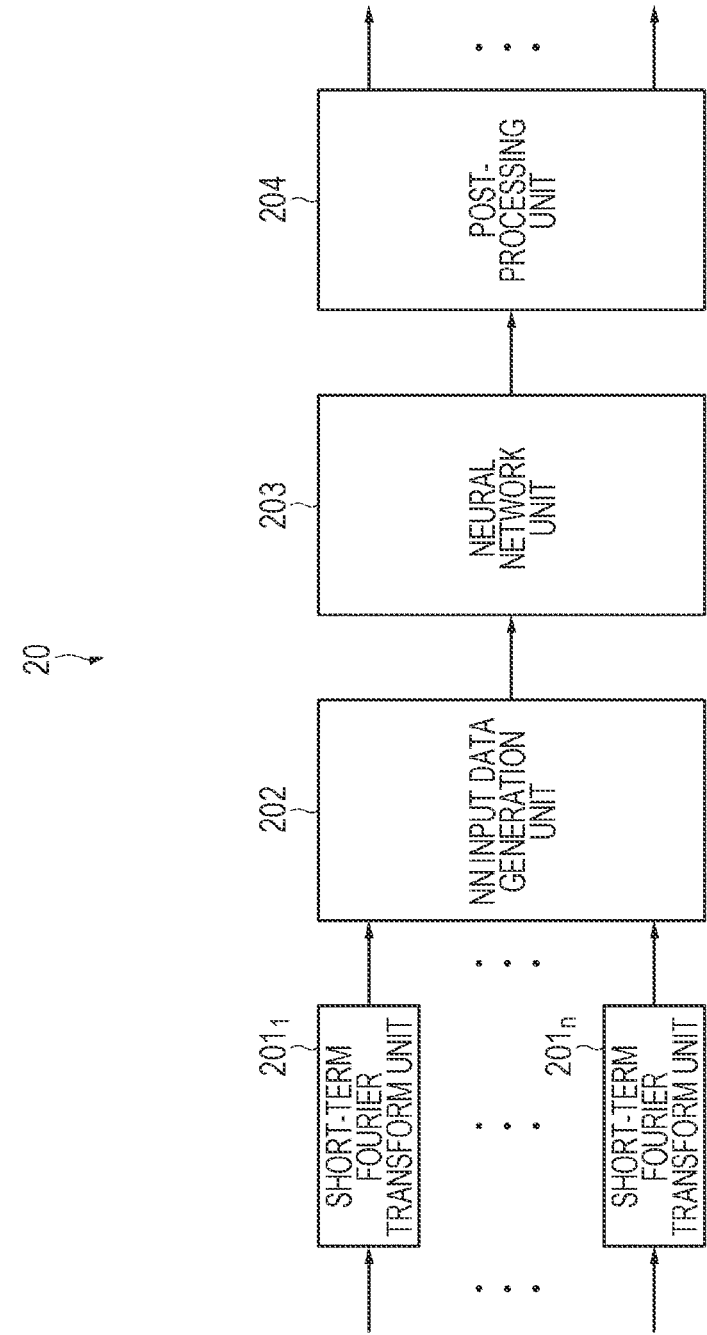

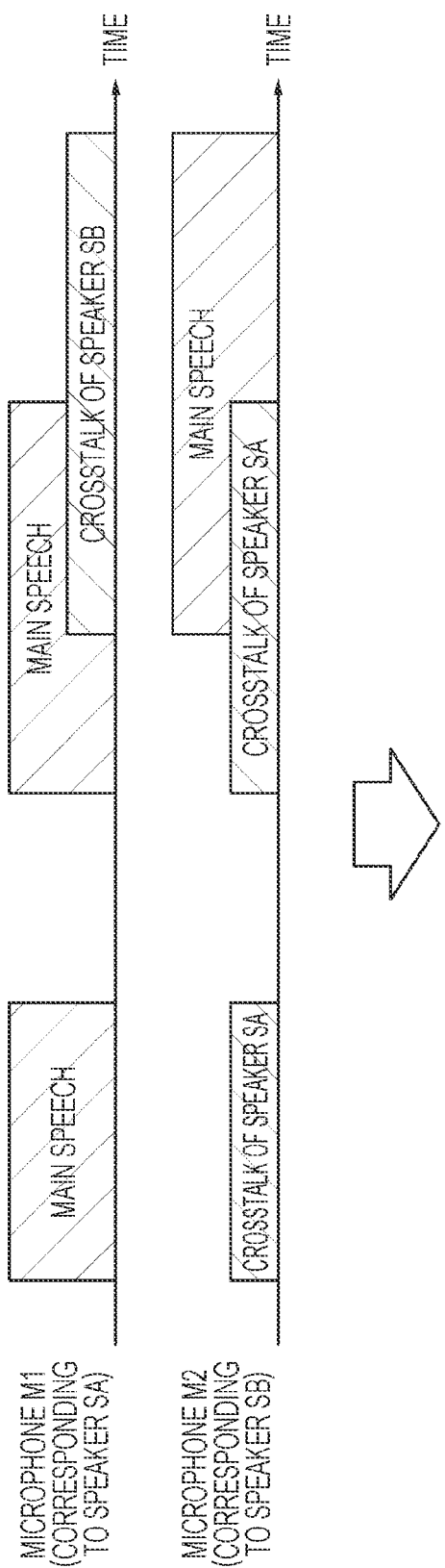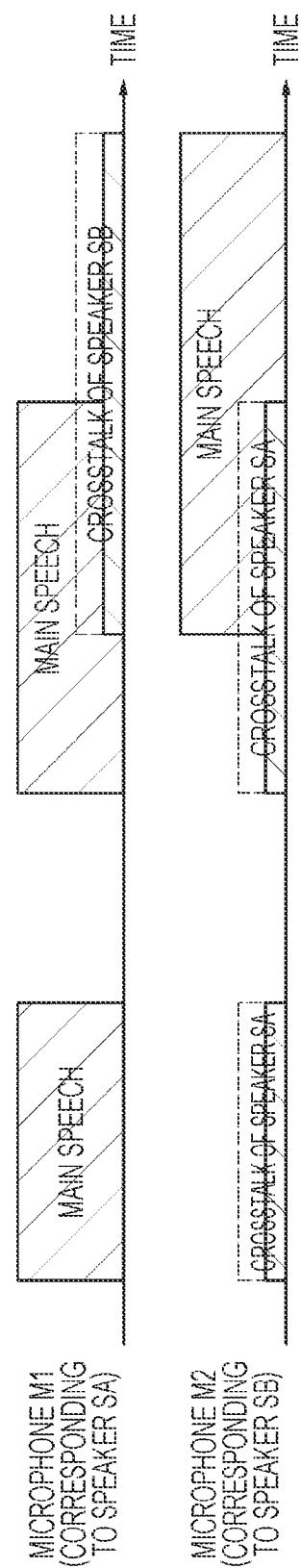
FIG. 7A
FIG. 7B

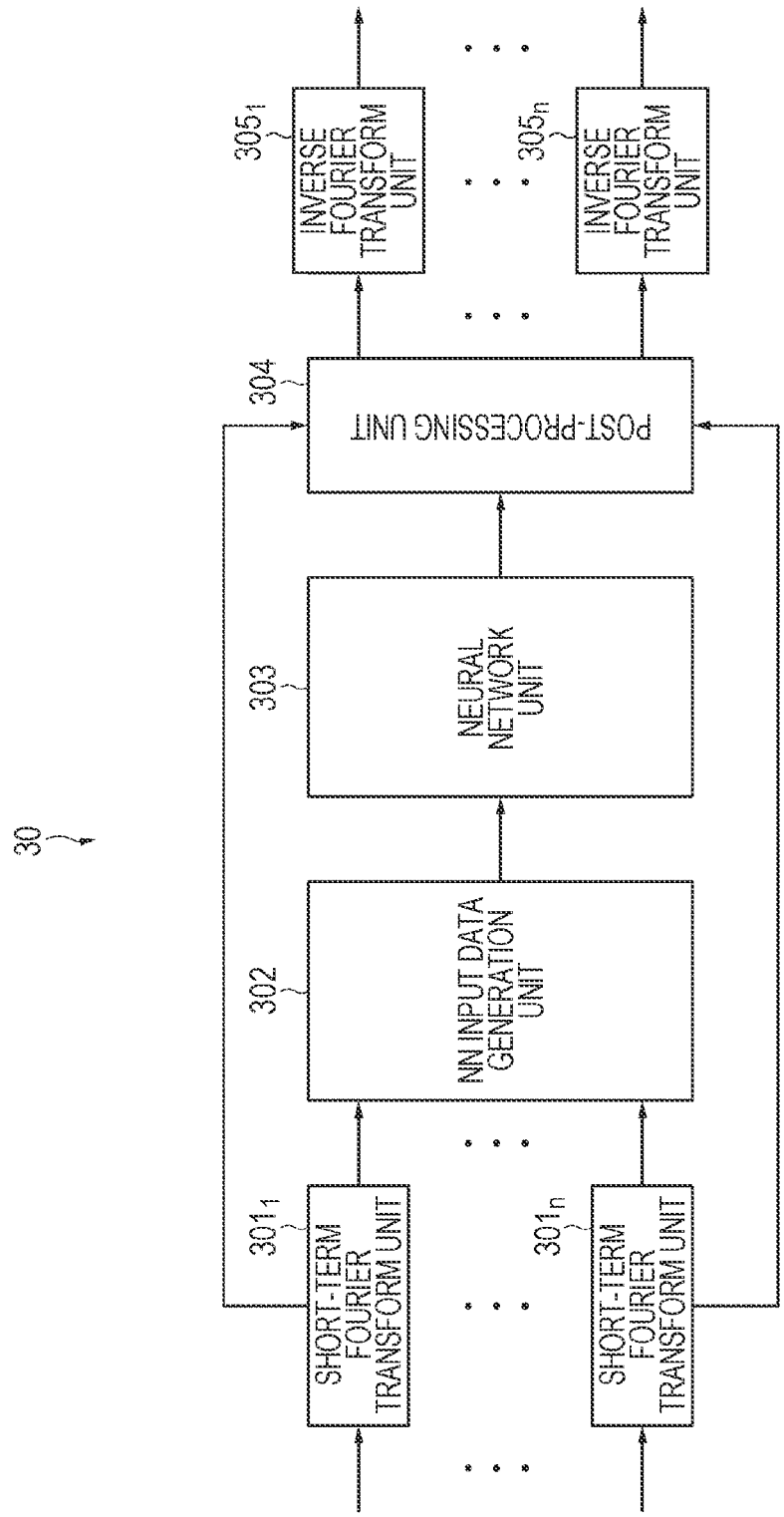

FIG. 10

| SPEAKER'S STATE | | | INPUT DATA | | TEACHER DATA | |
|---|---|---|---|---|---|---|
| SPEAKER 4A | SPEAKER 4B | OTHER SPEAKERS | MICROPHONE MA | MICROPHONE MB | MICROPHONE MA | MICROPHONE MB |
| SPEAKING | SPEAKING | SPEAKING | Ad+Bc+Oc | Ac+Bd+Oc | Ad | Bd |
| SPEAKING | SPEAKING | | Ad+Bc | Ac+Bd | Ad | Bd |
| SPEAKING | | SPEAKING | Ad+Oc | Ac+Oc | Ad | SILENCE |
| SPEAKING | | | Ad | Ac | Ad | SILENCE |
| | SPEAKING | SPEAKING | Bc+Oc | Bd+Oc | SILENCE | Bd |
| | SPEAKING | | Bc | Bd | SILENCE | Bd |
| | | SPEAKING | Oc | Oc | SILENCE | SILENCE |
| | | | SILENCE | SILENCE | SILENCE | SILENCE |

A: SPEAKER A
B: SPEAKER B
O: OTHER SPEAKERS
d: MAIN SPEECH
c: CROSSTALK

WAVEFORM OF MICROPHONE-RECORDED SIGNAL

CUT-OUT & WINDOW

SHORT-TERM FOURIER TRANSFORM

SPECTROGRAM OF MICROPHONE-RECORDED SIGNAL $X(1, t-1)$ TO $X(K, t-1)$ $X(1, t)$ TO $X(K, t)$ $X(1, t+1)$ TO $X(K, t+1)$

FIG. 18

| SPEAKER'S STATE | | INPUT DATA | | TEACHER DATA FOR MAIN SPEECH DETECTION | | TEACHER DATA FOR CROSSTALK REDUCTION | |
|---|---|---|---|---|---|---|---|
| SPEAKER SA | OTHER SPEAKERS | MICROPHONE MA | MICROPHONE MB | MICROPHONE MA | MICROPHONE MB | SPEAKER SA | SPEAKER SB |
| SPEAKER SB | | | | | | | |
| SPEAKING SPEAKING SPEAKING | | Ad+Bc+Oc | Ac+Bd+Oc | 1 | 1 | Ad | Bd |
| SPEAKING SPEAKING | | Ad+Bc | Ac+Bd | 1 | 1 | Ad | Bd |
| SPEAKING | SPEAKING | Ad+Oc | Ac+Oc | 1 | 0 | Ad | SILENCE |
| SPEAKING | | Ad | Ac | 1 | 0 | Ad | SILENCE |
| SPEAKING | SPEAKING | Bc+Oc | Bd+Oc | 0 | 1 | SILENCE | Bd |
| SPEAKING | | Bc | Bd | 0 | 1 | SILENCE | Bd |
| | SPEAKING | Oc | Oc | 0 | 0 | SILENCE | SILENCE |
| | | SILENCE | SILENCE | 0 | 0 | SILENCE | SILENCE |

A: SPEAKER SA
B: SPEAKER SB
O: OTHER SPEAKERS
d: MAIN SPEECH
c: CROSSTALK

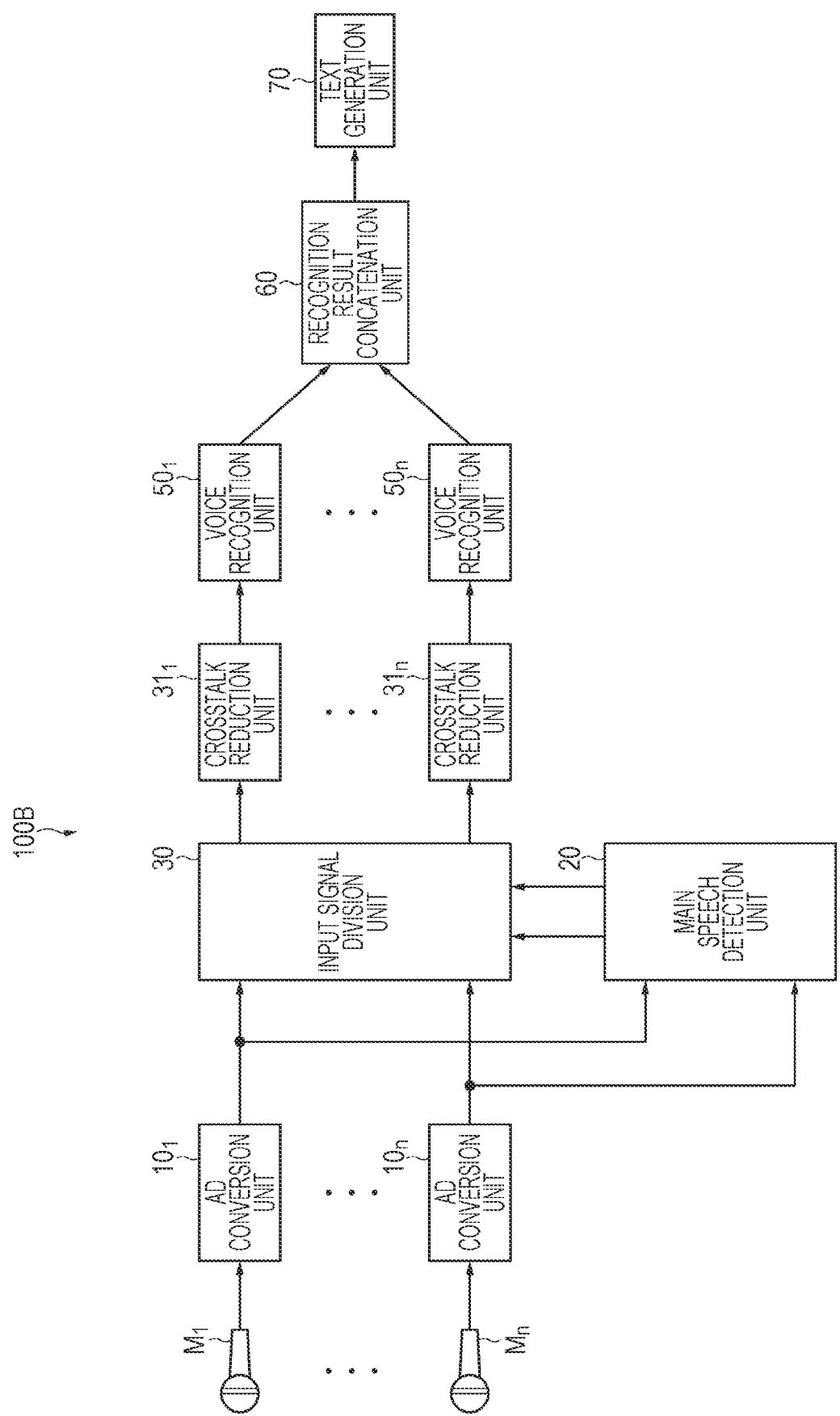

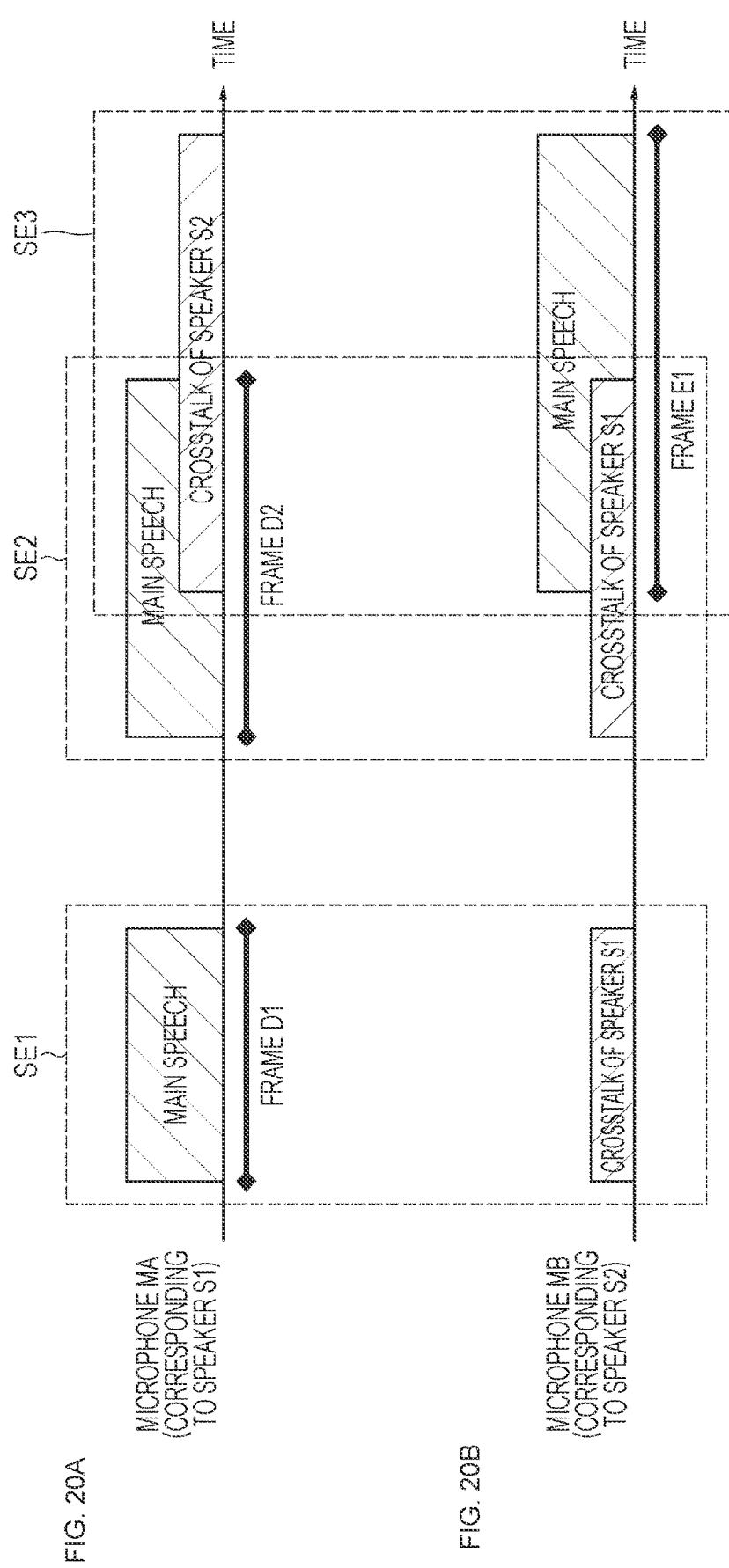

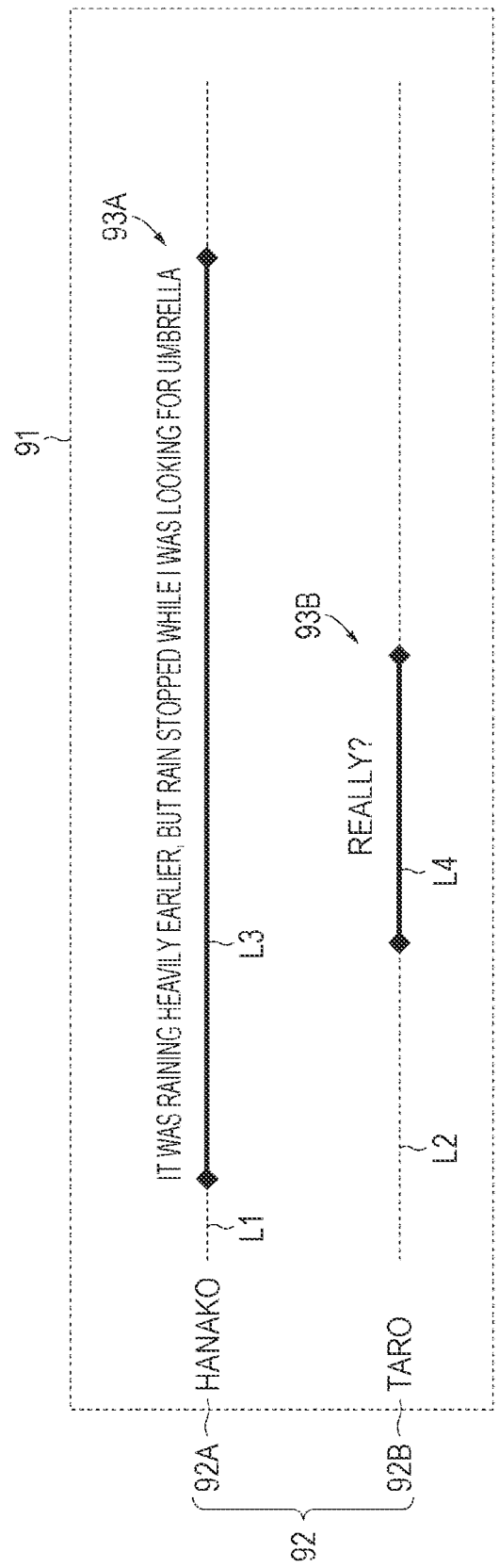

SIGNAL PROCESSING DEVICE, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2020/046023 filed on Dec. 10, 2020, which claims priority benefit of Japanese Patent Application No. JP 2019-227192 filed in the Japan Patent Office on Dec. 17, 2019. Each of the above-referenced applications is hereby incorporated herein by reference in its entirety.

TECHNICAL FIELD

The present disclosure relates to a signal processing device, a signal processing method, a program, and a signal processing system.

BACKGROUND ART

A technology has been proposed in which a signal collected by a microphone is subjected to voice recognition, and a result of the voice recognition is transcribed into text data (see, for example, Patent Document 1 below).

CITATION LIST

Patent Document

Patent Document 1: Japanese Patent Application Laid-Open No. 2005-129971

SUMMARY OF THE INVENTION

Problems to be Solved by the Invention

In such a field, it is desired that a speech of each speaker be correctly recognized.

It is an object of the present disclosure to provide a signal processing device, a signal processing method, a program, and a signal processing system that allow for correct recognition of a speech of each speaker.

Solutions to Problems

The present disclosure provides, for example,
a signal processing device including:
a main speech detection unit configured to detect, by using a neural network, whether or not a signal input to a sound collection device assigned to each of at least two speakers includes a main speech that is a voice of the corresponding speaker, and output frame information indicating presence or absence of the main speech.

The present disclosure provides, for example,
a signal processing method including:
detecting, by a main speech detection unit, by using a neural network, whether or not a signal input to a sound collection device assigned to each of at least two speakers includes a main speech that is a voice of the corresponding speaker, and outputting frame information indicating presence or absence of the main speech.

The present disclosure provides, for example,
a program for causing a computer to execute a signal processing method including:
detecting, by a main speech detection unit, by using a neural network, whether or not a signal input to a sound collection device assigned to each of at least two speakers includes a main speech that is a voice of the corresponding speaker, and outputting frame information indicating presence or absence of the main speech.

The present disclosure provides, for example,
a signal processing system including:
a plurality of sound collection devices, each of which is assigned to one of speakers; and
a signal processing device including a main speech detection unit configured to detect, by using a neural network, whether or not a signal input to each sound collection device includes a main speech that is a voice of the corresponding speaker, and output frame information indicating presence or absence of the main speech.

BRIEF DESCRIPTION OF DRAWINGS

FIGS. 2A and 2B are diagrams referred to in a description related to a problem to be considered in the present disclosure.

FIGS. 4A and 4B are diagrams referred to in a description related to the outline of the embodiment of the present disclosure.

FIG. 5 is a diagram for illustrating a configuration example of a signal processing device according to the embodiment.

FIG. 6 is a diagram for illustrating a configuration example of a main speech detection unit according to the embodiment.

FIGS. 7A and 7B are diagrams for illustrating an overview of processing in a crosstalk reduction unit according to the embodiment.

FIG. 8 is a diagram for illustrating a configuration example of the crosstalk reduction unit according to the embodiment.

FIG. 10 is a diagram referred to in a description related to training data for crosstalk reduction or the like according to the embodiment.

FIG. 18 is a diagram for illustrating the modified example.

FIG. 19 is a diagram for illustrating a modified example.

FIGS. 20A and 20B are diagrams for illustrating the modified example.

FIG. 25 is a diagram for illustrating a modified example.

MODE FOR CARRYING OUT THE INVENTION

Figure 1A:
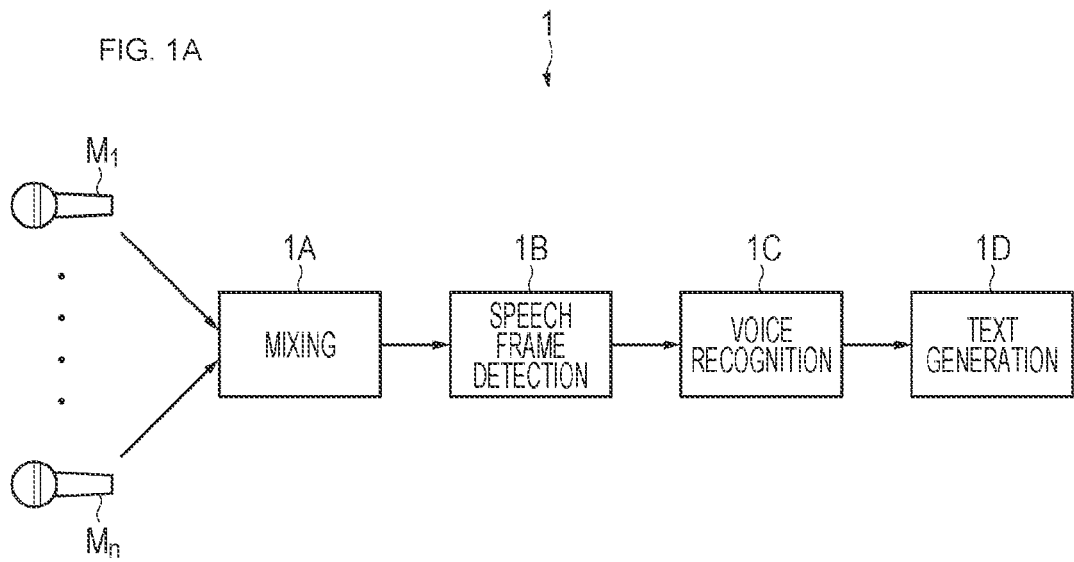
FIGS. 1A and 1B are diagrams referred to in a description related to a problem to be considered in the present disclosure.

An embodiment and the like of the present disclosure will be described below with reference to the drawings. Note that the description will be given in the order below.
 <Background of present disclosure>
 <Problems to be considered in present disclosure>
 <Embodiment>
 <Modified examples>

The embodiment and the like described below are preferred specific examples of the present disclosure, and contents of the present disclosure are not limited to the embodiment and the like.

<Background of Present Disclosure>

The present disclosure provides, for example, a system for automatically generating a transcription text for a voice recorded in a situation in which a microphone is assigned to each one of a plurality of speakers. Generation of a transcription for such a voice has problems to be considered different from those in a case of recording with a single speaker and a single microphone. The present disclosure deals with a technology mainly related to a portion related to speech detection.

First, a background of the present disclosure will be described. Examples of a conceivable situation in which a microphone is assigned to each speaker include the following:

In recording of a television program or the like, each performer, who is a speaker, is wearing a pin microphone near a collar.

In recording of a radio program or the like, a unidirectional microphone is prepared for each performer, and is installed close to the performer with directivity (direction in which sensitivity is high) toward the performer.

Other assumed modes in which a microphone is installed at a position relatively close to the mouth of each speaker include: a mode in which each speaker is wearing a device (a type of headset), in which an earphone and a microphone are integrated, on an ear; a mode in which each speaker is wearing a microphone shaped like a name badge near the chest; and a mode in which each speaker has a microphone with a neck strap hanging around the neck.

In the following description, a microphone used in such a mode is referred to as a "wearable distributed microphone" as appropriate, and sound recorded by such a microphone is referred to as a "sound recorded by a wearable distributed microphone" as appropriate.

Sound recorded by a wearable distributed microphone has the following features.

As a first feature, a speech of each speaker is collected most loudly by the microphone assigned to the speaker, but is collected also by other microphones as sound that has crossed over. In the following description, the former is referred to as "main speech" or "main voice" as appropriate, and the latter is referred to as "crosstalk" as appropriate.

As a second feature, since each speaker can speak at a free timing, speeches of a plurality of speakers may exist at the same timing. In the following description, speeches of a plurality of speakers existing at the same timing are referred to as "overlapping speeches" as appropriate.

When a main speech collected by one microphone is compared with a crosstalk, the crosstalk tends to be lower in volume and, moreover, contain more reverberation components due to the distance from the mouth to the microphone. However, since the loudness of voice varies from person to person, the crosstalk of a person with a loud voice may have a larger amplitude than the main speech of a person with a quiet voice.

As modes in which the above-described overlapping speeches occur, conceivable cases mainly include the following:
 One person mainly makes remarks, and the others are back-channeling. The back-channeling constitutes overlapping speeches.
 Basically, two persons are speaking alternately, but the next speech starts immediately before the end of the previous speech, which constitutes a slightly overlapping portion.
 A phenomenon commonly called "voice in unison", in which two or more speakers make the same speech substantially at the same time.

When voice recognition is performed on a recorded sound recorded under such an environment and a transcription text is created on the basis of a result of the voice recognition, the followings are requested regardless of whether the transcription text is generated fully automatically or modified manually.
 a) It is desired that a speech of one speaker, which is collected by a plurality of microphones, be recorded as one remark in the transcription text. (It is not desirable that the same speech appear a plurality of times.)
 b) It is desired that overlapping speeches be recorded as remarks of the same number as the overlapping speeches. For example, in a case where speeches of two persons overlap, it is desirable that the individual speeches be recorded as two remarks. It is not desirable that one of the speeches be missing, or the speeches be recorded as three or more speeches.
 c) It is desired that the individual speeches be correctly transcribed even in a case where speeches overlap.
 d) It is desired that remarks be recorded so as to enable distinction between the persons who made the remarks.

In a case of automatically generating a transcription text, it is desirable to satisfy a) to d) described above because the more the requests are satisfied, the more the labor of manually modifying the transcription text later can be reduced.

<Problems to be Considered in Present Disclosure>

Next, along with a description of general technologies for responding to the above-described requests, problems to be considered in the present disclosure will be described.

Figure 1B:
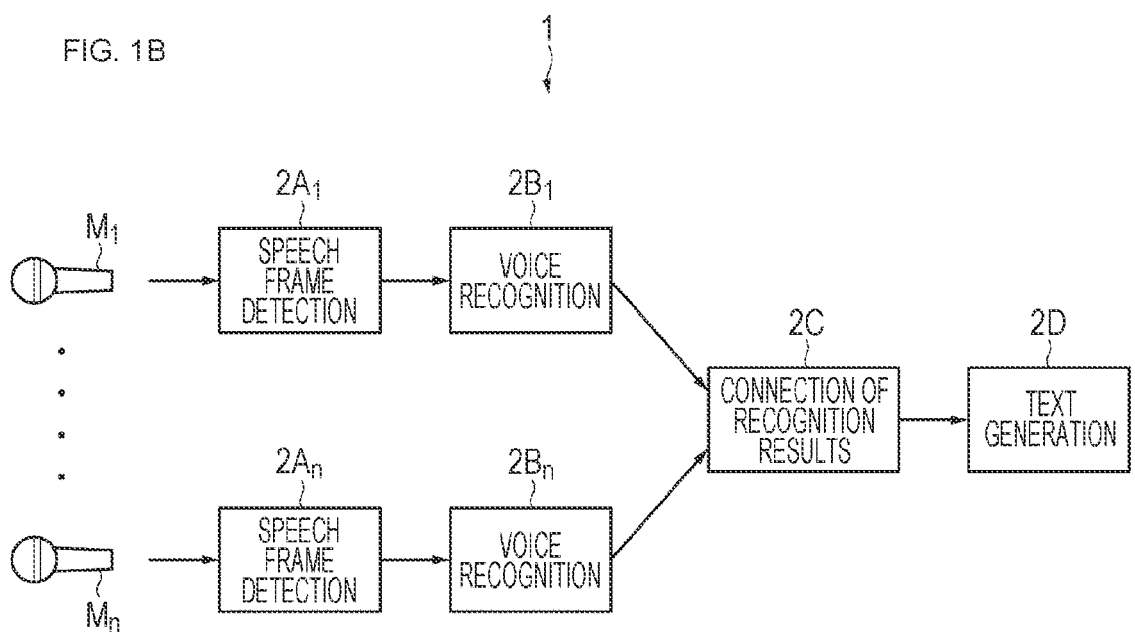

As a system for automatically generating a transcription text for sound recorded by a wearable distributed microphone, there are two configurations illustrated in FIGS. 1A and 1B. In a system 1 illustrated in FIG. 1A, after mixing processing 1A for mixing recorded sounds, each of which has been recorded by one of a plurality of microphones ($M_1$ to $M_n$), speech frame detection processing 1B for detecting a speech frame and voice recognition processing 1C are performed, and text generation processing 1D is performed on the basis of a result of the voice recognition processing 1C.

In a system 2 illustrated in FIG. 1B, after speech frame detection processing $2A_1$ to $2A_n$ and voice recognition processing $2B_1$ to $2B_n$ for each one of a plurality of microphones, connection processing 2C for connecting results of the voice recognition is performed, and text generation processing 2D is performed on the basis of a result of the connection processing 2C. The embodiment of the present disclosure described later is based on the premise that the system 2 is used. Hereinafter, a description of the system 1 will be given first, and then a description of the system 2 in comparison with the system 1 will be given.

As a technology based on the assumption that the system 1 is used, there are technologies described in Japanese Patent Application Laid-Open No. 2005-129971, Japanese Patent Application Laid-Open No. 2007-133033, and Japanese Patent Application Laid-Open No. 2008-9693. In the configuration of the system 1, a single track is formed at the time of mixing recorded sounds, and this makes it possible to avoid a plurality of recognition results being generated from a single speech, which is included in problems caused by crosstalk described later. On the other hand, it is difficult in principle to generate a plurality of voice recognition results for overlapping speeches. Furthermore, even in a case where overlapping speeches are collected by each microphone with a high signal to noise ratio (SNR) (the voice of the corresponding speaker is collected as a louder sound), the SNR decreases at the time of mixing. Thus, there is a high possibility that a single voice recognition result generated for overlapping speeches is imprecise and does not apply to either of the speeches. That is, the system 1 generates a highly accurate transcription (text) in a case where there is almost no overlapping speeches, but the transcription requires more manual modification as the rate of overlapping speeches is higher. Furthermore, since it is not possible to specify the speaker of a speech (the speaker to which the microphone, from which a signal is derived, is assigned) once the recorded sounds have been mixed, it is necessary to combine the technology with another technology such as speaker identification and image processing in order to respond to the request d) described above.

On the other hand, as a technology based on the assumption that the system 2 is used, there are technologies described in Japanese Patent Application Laid-Open No. 2006-39108 and Japanese Patent Application Laid-Open No. 2006-301223. In the configuration of the system 2, a speech of each speaker is collected most intensely by the microphone assigned to the speaker, and is collected as a less loud sound by the other microphones. Thus, it is relatively easy to specify from which speaker an input voice is derived. Furthermore, even in a case where speeches overlap, a microphone assigned to each speaker most dominantly collects a speech of the speaker, and it is therefore expected that a relatively precise voice recognition result can be obtained in a case where a frame of the speech is precisely estimated and the microphone corresponding to the speaker is precisely selected.

However, in the configuration of the system 2, a speech of one speaker is also collected as crosstalk by a microphone assigned to a speaker who is not speaking at that point of time, and this causes a variety of problems. Hereinafter, problems caused by crosstalk and measures against the problems will be described.

Since crosstalk is voice, in a case where a technology for detecting a frame in which a "voice-like" signal has been input is applied as the speech frame detection processing $2A_1$ to $2A_n$ of the system 2, not only the main speech but also the crosstalk is detected as speech frames. Voice recognition is performed for each frame, and a plurality of recognition results (at most the same number as the microphones) is generated for one speech. This cannot satisfy the request a) described above.

Thus, a technology for discriminating whether or not a speech is crosstalk, or whether or not a speech is a main speech, has been proposed (e.g., the technology described in Japanese Patent Application Laid-Open No. 2006-39108). According to such a technology, correlation coefficients between microphones are calculated on the hypothesis that a speech of each speaker arrives earliest at the assigned microphone and is collected as the loudest sound, and thus the microphone corresponding to the main speech is determined. Furthermore, Document 1 "'DNN APPROACH TO SPEAKER DIARISATION USING SPEAKER CHANNELS', Rosanna Milner, Thomas Hain, Speech and Hearing Research Group, University of Sheffield, UK, ICASSP 2017" describes using deep neural networks (DNNs) to learn a discriminator. Moreover, training is performed for each pair of microphones, and the required number of pairs are combined at the time of inference, so that it is possible to support any number of microphones. A neural network referred to herein is a model like a human cranial nerve circuit, and is a technique for implementing learning ability of a human on a computer. One of features of a neural network is that a neural network has learning ability. In a neural network, artificial neurons (nodes) that form a network by synaptic connection change the strength of synaptic connection through training, so that it is possible to acquire ability to solve a problem. That is, a neural network that has been repeatedly trained can automatically infer a rule for solving a problem.

By taking measures against crosstalk, it is possible to avoid the problem of a plurality of recognition results being generated for one speech, and a single recognition result is generated. However, on the other hand, even in a case where it is desired to generate a plurality of recognition results for overlapping speeches, a trade-off occurs in which only a single recognition result is generated. Thus, there is a technology for detecting overlapping speeches, separately from determination of crosstalk.

As technologies for detecting overlapping speeches, Document 2 "'Overlapped speech detection for improved speaker diarization in multiparty meetings', K. Boakye, B. Trueba-Hornero, O. Vinyals, G. Friedland, ICASSP 2008" and Document 3 "'Detecting overlapping speech with long short-term memory recurrent neural networks', J. T. Geiger, F. Eyben, B. Schuller, G. Rigoll, INTERSPEECH 2013" have been proposed. Note that these technologies are "technologies for detecting a portion (timing) where speeches overlap". On the other hand, the embodiment of the present disclosure is a "speech detection technology that also supports overlapping speeches" as described later, and the two are different technologies.

Next, problems in the system 2 will be described. In real free speech, the number of overlapping speeches changes from moment to moment. It frequently occurs that only one person is speaking at a certain timing, a plurality of speeches partially overlaps at another timing, and no one is speaking at still another timing. However, it has conventionally been difficult to detect each speech with a single technology in such a situation, and thus, a combination of voice activity detection (e.g., the technology described in Japanese Patent No. 4182444), crosstalk detection (e.g., the technology described in Japanese Patent Application Laid-Open No. 2006-39108 and the technology described in Document 1), and overlapping speech detection (the technologies described in Documents 2 and 3 described above) has been used to cope with the situation.

For example, a situation in which two speakers are speaking is assumed. The two speakers are a speaker SA and a speaker SB. A microphone assigned to the speaker SA is a microphone MA, and a microphone assigned to the speaker SB is a microphone MB. FIGS. 2A and 2B are diagrams illustrating a speech of each speaker collected by each microphone in chronological order. In FIGS. 2A and 2B, the speech collected by each microphone is indicated by a horizontally long rectangle. The vertical direction of the rectangle indicates the volume of the speech, and the horizontal direction of the rectangle indicates the frame (time) of the speech. It is normally considered that the main speech is collected as a louder sound than the crosstalk, and the main speech is indicated by a rectangle higher than the crosstalk.

FIGS. 2A and 2B illustrate an example in which the speaker SA speaks about twice, and the speaker SB starts to speak in the middle of the second speech of the speaker SA, continues to speak after the end of the speech of the speaker SA, and then ends the speech. Since the number of speeches made in FIGS. 2A and 2B are three, in order to generate a voice recognition result corresponding to each speech, it is desirable to detect only three frames: a frame A1 and a frame A2 corresponding to the main speeches of the speaker SA; and a frame B2 corresponding to the main speech of the speaker SB. However, since it is difficult to detect these frames with a single technology, the frames are estimated with a combination of a plurality of technologies.

For example, first, voice activity detection is applied to each microphone. Since the voice activity detection detects a frame in which a "voice-like" signal is input, not only the frame A1, which is the main speech, but also a frame B1, which is crosstalk, is detected for the first speech of the speaker SA. The second speech of the speaker SA and the first speech of the speaker SB cannot be distinguished from each other, and are detected as a frame A3 and a frame B3, which are long frames in which the two speeches are connected.

Next, crosstalk detection is performed on the detected four frames (frames A1, A3, B1, and B3). Since the crosstalk detection is basically based on the hypothesis that speeches do not overlap, it can be expected that a highly accuracy estimation is obtained for a portion where the hypothesis is established (frames A1, A4, A6, B1, B4, and B6), and it is determined that the frames A1, A4, and B6 include a main speech and the frames A6, B1, and B4 include crosstalk. On the other hand, the hypothesis described above is not established in a frame where speeches overlap (frames A5 and B5), and thus the determination result for the frame is imprecise.

Thus, next, overlapping speech detection is applied to each of the detected four frames (frames A1, A3, B1, and B3), and a determination result that the frame A5 and the frame B5 include overlapping speeches is obtained. Finally, the determination results described above are integrated according to a rule or the like, and the frames A1, A2, and B2, which are speech frames of the speakers, are obtained.

Since a frame of a main speech has conventionally been estimated with a combination of a plurality of detection technologies as described above, there has been a problem in that an upper limit of the accuracy of finally obtained frames is lowered due to the accuracy of each technology.

Note that, as described in Document 4 "'MULTICHANNEL SPEAKER ACTIVITY DETECTION FOR MEETINGS', Patrick Meyer, Rolf Jongebloed, Tim Fingscheidt, Institute for Communications Technology, ICASSP2018", there is a speech frame detection technology that is used on a voice recorded by a wearable distributed microphone and supports both single speeches and overlapping speeches. In the technology described in Document 4, a value derived from a power ratio between a microphone that is collecting the loudest sound and each microphone is used as a feature amount for determining whether or not a speech is a main speech. Processing corresponding to normalization or smoothing is performed on the power ratio for each microphone, and then whether or not a speech is a main speech is determined by comparison with a predetermined threshold. However, in order to avoid a frame (background noise frame) in which no one is speaking from being determined as a main speech, the power ratio between the background noise frame and each microphone input signal is also used, and determination is performed only when a sound louder than a certain level is input. According to this scheme, in a case where there is a plurality of microphones in which the feature amount exceeds a threshold, each speech is detected even in a case of overlapping speeches.

However, in the technology described in Document 4, since there is a large number of parameters that need to be adjusted such as a threshold and a smoothing coefficient, there is a problem in that it is necessary to adjust the parameters for each environment in order to achieve an operation of detecting all overlapping speeches while ignoring crosstalk. Furthermore, in the technology described in Document 4, in order to prevent one speech from being detected as a plurality of divided frames, processing corresponding to smoothing in the time direction is performed on the feature amount. However, as a side effect thereof, there is a problem in that, in a case where a speaker ends a speech before others during overlapping speeches, the speaker tends to be determined as still being speaking until everyone ends the speech. For example, describing with reference to the example illustrated in FIGS. 2A and 2B, the speaker SA ends the speech first in the overlapping speeches between the speaker SA and the speaker SB, and it is desirable that the frame A2 be detected as the frame of the main speech. However, in the method of Document 4, detection of a terminal end is postponed until the speech of the speaker SB ends, and there is a possibility that the frame A3 is detected as a frame of a main speech of the speaker SA.

In the conventional technologies, it is difficult to detect only a main speech with high accuracy while ignoring crosstalk from voices recorded in an environment in which a microphone is assigned to each speaker as described above, and the conventional technologies have not been enough. In light of the above points, the embodiment of the present disclosure will be described.

<Embodiment>

[Outline]

First, an outline of the embodiment will be described. It is desirable to detect only the main speech for each microphone regardless of whether or not speeches overlap or regardless of the number of overlapping speeches. Thus, in the present embodiment, the following two elements are introduced.

a) An issue of speech detection supporting overlapping speeches is regarded as a multi-label classification issue of giving a label indicating whether or not each speaker is speaking. A multi-label classifier is trained using sound data in which speeches, the number of which is zero or more and equal to or less than the number of microphones, overlap and zero or more labels corresponding thereto.

b) Two or more and n or less microphone-recorded sounds are input to the multi-label classifier. (Where n is the number of microphones.)

Each of them will be described below.

When the number of microphones is n, that is, the number of the corresponding speakers is also n, the issue of speech detection supporting overlapping speeches can be interpreted as an issue of giving a label to a portion (timing) where each speaker is speaking. Since the label is different for every speaker, the number of labels to be given is at least zero (when everyone is silent) and at most n (when everyone is speaking). Such an issue of giving number variable labels is referred to as a multi-label classification issue.

Details of the multi-label classification issue are described in Document 5 "'Mining Multi-label Data', G. Tsoumakas, I. Katakis, I. Vlahavas, Data Mining and Knowledge Discovery Handbook, Part 6, O. Maimon, L. Rokach (Ed.), Springer, 2nd edition, pp. 667-685, 2010" and Document 6 "'Deep learning for multi-label classification', Read, J., Perez-Cruz, F., CoRR abs/1502.05988 (2014), https://arxiv.org/abs/1502.05988". Document 5 is a general explanation of each approach for resolving the multi-label classification issue, and Document 6 is an explanation for resolving the multi-label issue with a DNN.

Any scheme can be used as the multi-label classifier, and the following description will be given on the premise that a neural network (NN) is used. Then, causing a classifier to memorize a correspondence relationship between input data and a label by using data is referred to as "training", and detecting a main speech by using a trained classifier is referred to as "inference". Moreover, a description will be given on the premise that a scheme called binary relevance, which is included in various multi-label classification approaches mentioned in Document 5, is used. Binary relevance is a scheme in which binary classifiers, each of which corresponds to one of n types of labels, are prepared so that zero or more and n or less labels are output. This corresponds to preparing binary discriminators of the same number as the microphones, the binary discriminators being for discriminating whether or not an input sound of each microphone is a main speech, in the present disclosure.

Next, the above-described element b) will be described. A main speech and crosstalk differ in volume (power) and degree of reverberation, but neither of them is an absolute standard, and it is therefore difficult to distinguish between (perform correct classification into) the main speech and the crosstalk from an input signal of a single microphone. On the other hand, when input signals of a plurality of microphones are input to a classifier, the volume and reverberation can be perceived in relative terms, and the classification becomes easier.

Figure 3A:
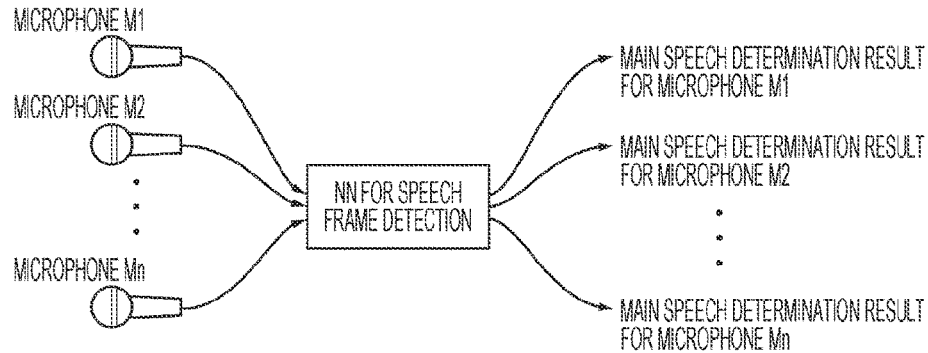
FIGS. 3A, 3B, and 3C are diagrams referred to in a description related to an outline of an embodiment of the present disclosure.
Figure 3B:
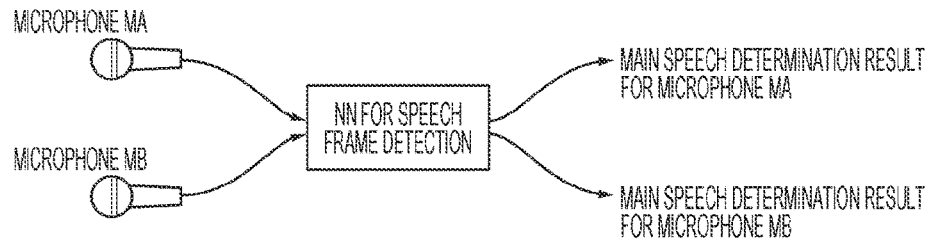

Two types of schemes are conceivable as to the number of microphones from which signals are to be input to a multi-label classifier and the number of discrimination results to be output. In the first scheme, as schematically illustrated in FIG. 3A, in a case where the number of microphones at the time of inference is n (microphones M1 to Mn), n microphone-recorded sounds (or signals generated by applying a predetermined transform to the recorded sounds) are input to a multi-label classifier using a neural network, and n main speech discrimination results corresponding to the microphones are output from the multi-label classifier. In the second scheme, as schematically illustrated in FIG. 3B, training is performed as a two-input/two-output multi-label classifier at the time of training, and classifiers of the same number as pairs of microphones are prepared at the time of inference so that discrimination is performed for each microphone pair. Then, discrimination results are integrated for each microphone.

In the scheme illustrated in FIG. 3A, it is necessary to train another multi-label classifier for each number of microphones. On the other hand, in the scheme illustrated in FIG. 3B, once a multi-label classifier has been trained, it is possible to support any number of microphones at the time of inference.

The scheme illustrated in FIG. 3B is a two-input/two-output neural network. The input is sounds recorded by the two microphones MA and MB (or signals generated by applying a predetermined transform to the recorded sounds), and the output is frame information indicating whether or not the main speech is included in the sound recorded by each microphone (presence or absence of the main speech), and is, for example, binary discrimination results. The output of the neural network may be a continuous value such as a probability that a main speech is included, and the continuous value may be transformed into a binary value on the basis of a predetermined threshold in the subsequent processing.

Figure 3C:
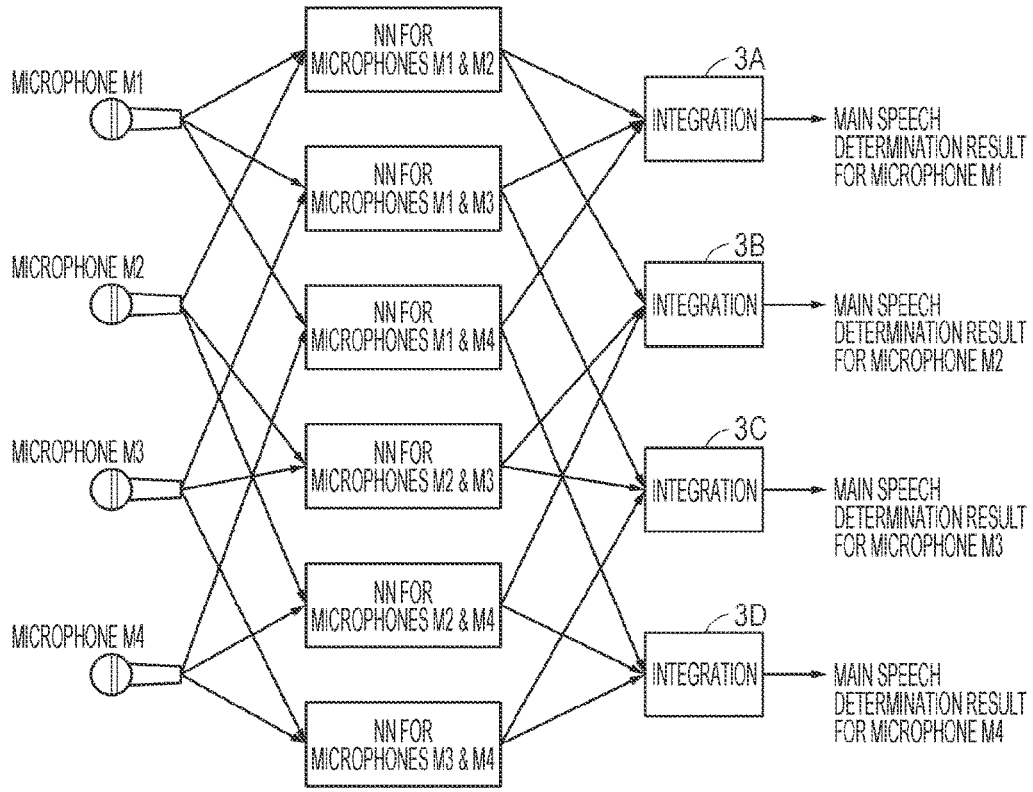

FIG. 3C illustrates an example in which the neural network illustrated in FIG. 3B is applied to a case where there are four microphones (microphones M1 to M4), for example. Since there may be six patterns of pairs in the case of four microphones, six two-input/two-output neural networks illustrated in FIG. 3B are applied. Each neural network may be the same.

In a case where inference is performed for each pair of microphones, (n−1) inference results are generated for one microphone. Thus, integration modules 3A to 3D that integrate inference results, one for each of the microphones, are prepared. The integration modules 3A to 3D output one discrimination result for each microphone. Specifically, the integration module 3A outputs a main speech determination result for the microphone M1, the integration module 3B outputs a main speech determination result for the microphone M2, the integration module 3C outputs a main speech determination result for the microphone M3, and the integration module 3D outputs a main speech determination result for the microphone M4.

The following processing contents are exemplified as the processing performed by each integration module.

(Integration Method 1)

Each neural network outputs a binary value. Each integration module receives a binary value, which is an output of each neural network, and obtains a single discrimination result (binary value) by a logical sum. Alternatively, each integration module may receive a binary value, which is an output of each neural network, and obtain a single discrimination result (binary value) by a logical conjunction. Furthermore, each integration module may obtain a single discrimination result (binary value) in accordance with whether or not the number of true values exceeds a predetermined number.

(Integration Method 2)

Each neural network outputs a continuous value such as a probability that a main speech is included. Each integration module receives the continuous value, obtains a single continuous value by any of methods including maximum, minimum, average, and median, and then transforms the continuous value into a binary value on the basis of a predetermined threshold.

(Integration Method 3)

A two-input/two-output multi-label classifier and each integration module are connected by a weighted connection. An appropriate weight of each connection is calculated on the basis of data different from training data. In other words, a neural network having the same form as illustrated in FIG. 3C is constructed, and the weight is learned again. A single discrimination result is obtained on the basis of a result of the training.

Next, a method of creating training data will be described. The training data in the present embodiment is constituted by a set of input data and a teacher label. The input data is a signal in which zero or more and n or less speeches overlap, and the output is a label corresponding thereto. The training data may be created by recording actual speeches in an environment in which each of n speakers is wearing a microphone, and giving a label to a frame of a main speech for each speaker later. Alternatively, the training data may be created by recording a single speech of each speaker with n microphones, and performing mixing on a computing machine later. Alternatively, instead of recording in an actual environment, an impulse response corresponding to a spatial transfer function from each speaker to each microphone may be prepared, and then a convolution operation may be performed with a separately prepared voice of a dry source and the impulse response.

The n-input/n-output neural network illustrated in FIG. 3A can be trained using training data, which has thus been prepared, as it is. On the other hand, in order to learn a two-input/two-output neural network illustrated in FIG. 3B, it is necessary to process data. This point will be described with reference to FIGS. 4A and 4B.

FIG. 4A is a diagram illustrating an example of a recording environment. In the present example, the number of speakers and the number of microphones are both four, and each of the speakers is referred to as one of speakers 4A to 4D, and each of the microphones are referred to as one of microphones MA to MD. It is assumed that the microphone MA is assigned to the speaker 4A, the microphone MB is assigned to the speaker 4B, the microphone MC is assigned to the speaker 4C, and the microphone MD is assigned to the speaker 4D. It is assumed that input data and a teacher label for this environment are already prepared.

In order to learn a two-input/two-output neural network, two microphones are selected from the four microphones. When the order is also taken into consideration, there are 12 possibilities. In the example illustrated in FIG. 3A, the microphone MA and the microphone MB are selected. For the microphones MA and MB, it is sufficient if all the speeches of the speakers other than the speakers 4A and 4B are treated as crosstalk, and it is not necessary to distinguish the speeches. Thus, the speaker 4C and the speaker 4D are collectively referred to as "other speakers".

FIG. 4B is a diagram illustrating an example of each speaker's state (whether or not the speaker is speaking), and input data and a teacher label corresponding to the state. In the Input data column in FIG. 4B, capital letters A, B, and 0 represent the speaker 4A, the speaker 4B, and the other speakers, respectively, and small letters d and c represent a main speech and crosstalk, respectively. In Teacher label, "1" and "0" indicate whether or not the speaker corresponding to each microphone is speaking.

For example, a case will be considered in which the speaker 4A and the other speakers are speaking. Since a signal (Ad+Oc) in which a main speech (Ad) of the speaker 4A and crosstalk (Oc) of the other speakers are mixed is input to the microphone MA, the teacher label corresponding to the microphone MA is "1" representing "speaking". On the other hand, a signal (Ac+Oc) in which crosstalk (Ac) of the speaker 4A and crosstalk (Oc) of the other speakers are mixed is input to the microphone MB, but the speaker 4B is not speaking at that point of time, and thus the teacher label corresponding to the microphone MB is "0".

In free speech, the length of a speech and the length of silence between speeches vary, and thus the speaker's state changes frequently. Thus, teacher labels are given at a fine time granularity of, for example, 1/100 (0.01) seconds.

In the example illustrated in FIG. 4A, two microphones, that is, the microphone MA and the microphone MB, are selected. For the other 11 patterns, training data is prepared in a similar manner. Moreover, training data is prepared for a variety of recording environments in a similar manner.

[Configuration Example of Signal Processing Device]

FIG. 5 is a diagram for illustrating a configuration example of a signal processing device (signal processing device 100) according to the embodiment. The present embodiment provides a system that automatically generates a transcription text for a voice recorded by a wearable distributed microphone, and provides a system including a plurality of microphones $M_1$ to $M_n$ as a plurality of sound collection devices and the signal processing device 100 as illustrated in FIG. 5. Note that, in the following description, in a case where it is not necessary to distinguish the individual microphones, the microphones are collectively referred to as microphones M as appropriate. Each of the microphones M is assigned to one of a plurality of speakers. The plurality of speakers is at least two speakers. Therefore, at least two microphones (microphones M1 and M2) are also prepared. Hereinafter, a signal recorded by a microphone is simply referred to as a signal. Note that a signal may be transmitted from each microphone M to the signal processing device 100 in a wired manner or in a wireless manner.

The microphones M are assigned each to one speaker, and each microphone is either worn by the speaker or installed near the speaker with directivity toward the speaker. Note that, in the subsequent module, a processing result is generated for each of the signals recorded by the microphones. Hereinafter, a unit for each of the speakers corresponding to the microphones will be referred to as a "track".

The signal processing device 100 includes, for example, analog to digital (AD) conversion units 10, a main speech detection unit 20, a crosstalk reduction unit 30, multipliers 40, voice recognition units 50, a recognition result concatenation unit 60, and a text generation unit 70. The AD conversion units 10 include an AD conversion unit $10_1$ to an AD conversion unit $10_n$ for signals recorded by the corresponding microphones. Similarly, the multipliers 40 include a multiplier $40_1$ to a multiplier $40_n$, and the voice recognition units 50 include voice recognition units $50_1$ to $50_n$. Note that, in a case where it is not necessary to distinguish the individual AD conversion units, the AD conversion units are collectively referred to as the AD conversion units 10 as appropriate. Furthermore, in a case where it is not necessary to distinguish the individual multipliers, the multipliers are collectively referred to as the multipliers 40 as appropriate. Furthermore, in a case where it is not necessary to distinguish the individual voice recognition units, the voice recognition units are collectively referred to as the voice recognition units 50 as appropriate.

The AD conversion units 10 convert signals in analog form acquired by the corresponding microphones M into signals of digital signals. The signals in digital form are supplied to each of the main speech detection unit 20 and the crosstalk reduction unit 30.

The main speech detection unit 20 detects whether or not a signal input to a sound collection device (microphone) assigned to each of at least two speakers includes a main speech that is a voice of the corresponding speaker by a neural network, and outputs frame information indicating presence or absence of the main speech. For example, the main speech detection unit 20 inputs microphone-recorded sounds for all tracks, and outputs, for each track, "1" representing true if the main speech is included, or "0" representing false if the main speech is not included. The determination is made at a predetermined time granularity. Even in a case where the recorded sound includes a voice of a speaker other than the corresponding speaker, "0" representing false is output if the main speech is not included. Note that the main speech detection unit 20 may output time information (e.g., the start time and end time of the main speech) of a frame that includes the main speech. Furthermore, the main speech detection unit 20 may detect whether or not a signal input to a sound collection device assigned to each of three or more speakers includes a main speech that is a voice of the corresponding speaker on the basis of results of detection by a plurality of neural networks. Then, the main speech detection unit 20 detects whether or not the main speech that is the voice of the speaker corresponding to the sound collection device is included by integrating the results of detection by the plurality of neural networks.

The crosstalk reduction unit 30 reduces components of voices of speakers other than the corresponding speaker included in a signal in digital form. The crosstalk reduction unit 30 inputs the microphone-recorded sounds for all tracks, and performs processing of reducing crosstalk while retaining a main speech for each track. Note that, in the present specification, "reducing crosstalk" includes not only removing the crosstalk but also suppressing the crosstalk (the crosstalk is reduced, if not completely removed). That is, in a case where the recorded sound is a mixture of the main speech and the crosstalk, the crosstalk is reduced and only the main speech is output. In a case where the recorded sound is only the main speech, the main speech is output as it is. Reducing the crosstalk is also referred to as emphasizing the main speech in some cases. Note that the signal processing device 100 may have a configuration without the crosstalk reduction unit 30. In a case of such a configuration, a signal in digital form is supplied to the multiplier 40.

The multiplier 40 multiplies the output of the main speech detection unit 20, the output of the crosstalk reduction unit 30, and the output of the main speech detection unit 20. By such multiplication, only a signal corresponding to a speech frame of each speaker, that is, a signal corresponding to the main speech, is sent to the voice recognition unit 50 in the subsequent stage.

The voice recognition unit 50 is prepared for each track, and generates a recognition result from the voice of the main speech. Moreover, in order to facilitate concatenating the recognition results for all tracks in the subsequent processing, a set obtained by connecting, in addition to the voice recognition results, information specifying a track such as a track number (that is, specifying the speaker), speech start time and end time, and the like is generated and then sent to the recognition result concatenation unit 60.

The recognition result concatenation unit 60 concatenates the voice recognition results generated for each track. At the time of concatenation, the recognition result concatenation unit 60 arranges the recognition results in order of time, and further displays speaker information (name and the like) corresponding to the track number together with the recognition result in order to clarify by whom the remark has been made.

The text generation unit 70 generates a text on the basis of a result of the concatenation by the recognition result concatenation unit 60.

Note that, instead of performing simple multiplication, the multiplier 40 may concatenate the output of the crosstalk reduction unit 30 and the output of the main speech detection unit 20, and transmit the concatenated data to the voice recognition unit 50. Specifically, the output data of the crosstalk reduction unit 30 is divided into fractions having a predetermined time length, and information as to whether or not a main speech is included, that is, information as to whether it is inside the main speech or outside the main speech is given as an attribute for each of the fractions. In this case, the voice recognition unit 50 performs voice recognition processing only on a portion included in received data, the portion being given the attribute "inside the main speech".

(Main Speech Detection Unit)

Next, details of the main speech detection unit 20 will be described with reference to FIG. 6. The main speech detection unit 20 includes, for example, short-term Fourier transform units 201, an NN input data generation unit 202, a neural network unit 203, and a post-processing unit 204. The short-term Fourier transform units 201 include short-term Fourier transform units $201_1$ to $201_n$ so as to correspond to the AD conversion units $10_1$ to $10_n$. Note that, in a case where it is not necessary to distinguish the individual short-term Fourier transform units, the short-term Fourier transform units are collectively referred to as the short-term Fourier transform units 201 as appropriate.

The short-term Fourier transform units 201 apply short-term Fourier transform (STFT) for each track to transform a signal into a complex spectrogram.

The NN input data generation unit 202 transforms a complex spectrogram for each track into data that can be input to a neural network (NN). Specifically, the NN input data generation unit 202 performs, for example, the following processing.

The NN input data generation unit 202 concatenates the complex spectrograms, one for each of the tracks, and transforms the concatenated complex spectrograms into a predetermined data format. The predetermined data format varies depending on the type of the neural network, and is, for example, a predetermined two-dimensional structure in a case of a fully connected NN, a predetermined three-dimensional structure in a case of a one-dimensional convolutional NN, and a predetermined four-dimensional structure in a case of a two-dimensional convolutional NN.

The NN input data generation unit 202 transforms a complex spectrogram into a real-valued spectrogram such as an amplitude spectrogram or a logarithmic spectrogram. Note that, in a case where a neural network that can handle complex numbers is used, transform into a real-valued spectrogram can be skipped.

The NN input data generation unit 202 performs normalization such as adjustment so that the root mean square of the spectrogram becomes 1.

In a case where the neural network unit 203 requests spectrograms for a plurality of frames, the NN input data generation unit 202 accumulates spectrograms until the number of the spectrograms reaches the number of the frames.

The neural network unit 203 is a neural network trained on a correspondence relationship between input data and a teacher label with the use of training data as illustrated in FIG. 4B.

The post-processing unit 204 transforms output data of the neural network unit 203 into a main speech detection result for each track. For example, the following processing is performed.

Processing of transforming output data (continuous value) of the neural network into a binary value indicating whether or not a speech is a main speech with the use of a threshold or the like.

Integration processing described with reference to FIG. 3C.

Smoothing processing on the output.

A supplementary description of the smoothing processing described above will be given. Since a speech frame has a certain length, in a case where the output of a speech detector changes drastically in a short time, there is a high possibility that a discrimination result is incorrect and does not correspond to the real speech. Thus, for example, the number of continued discrimination results indicating that the main speech is being made in the time direction is counted, and in a case where the discrimination result has changed to "outside the main speech" before the count reaches a predetermined number of times, processing of ignoring the change (assuming "outside the speech") is performed. Similarly, discrimination results "outside the main speech" are counted in a similar manner, and in a case where the determination result has changed to "the main speech is being made" before the count reaches the predetermined number of times, processing such as ignoring the change (assuming that the speech is still being made) is performed. Alternatively, instead of such rule-based smoothing, processing may be performed in which a low-pass filter is applied to output data (continuous value) of the neural network so that minute variations in the time direction are removed, and binarization is performed on the output after the application of the filter. Furthermore, instead of smoothing by the post-processing unit 204, a layer having an effect of smoothing in the time direction, such as "average pooling", may be inserted into the neural network unit 203.

Note that the main speech detection unit 20 illustrated in FIG. 6 is a configuration example based on the assumption that short-term Fourier transform is used for transform into a spectrogram, the spectrogram is processed, and data thus obtained is input. Furthermore, a result of discrimination on whether or not a speech is a main speech is generated for each frame of the spectrogram. Note that a signal may be directly input to the neural network, or processing in a time domain may be performed.

(Crosstalk Reduction Unit)

Next, details of the crosstalk reduction unit 30 will be described. FIGS. 7A and 7B are diagrams for schematically illustrating processing in the crosstalk reduction unit 30. The crosstalk reduction unit 30 reduces crosstalk included in a main speech illustrated in FIG. 7A. By such reduction processing, crosstalk is reduced as illustrated in FIG. 7B. Note that, although the entire crosstalk in a predetermined frame is reduced in FIG. 7B, only crosstalk in a frame overlapping a main speech may be reduced.

Crosstalk reduction processing is processing of removing crosstalk while retaining a main speech in signal components included in a microphone recording signal, and any scheme can be used. For example, various types of beam-forming processing may be performed with the microphones worn by the corresponding speakers regarded as a microphone array. Alternatively, a neural network similar to main speech detection may be used. Hereinafter, a description will be given using crosstalk reduction processing using a neural network as an example.

FIG. 8 is a diagram for illustrating a configuration example of the crosstalk reduction unit 30 according to the embodiment. The crosstalk reduction unit 30 includes, for example, short-term Fourier transform units 301, an NN input data generation unit 302, a neural network unit 303, and a post-processing unit 304. The short-term Fourier transform units 301 include short-term Fourier transform units 301$_1$ to 301$_n$ so as to correspond to the AD conversion units 10$_1$ to 10$_n$. Note that, in a case where it is not necessary to distinguish the individual short-term Fourier transform units, the short-term Fourier transform units are collectively referred to as the short-term Fourier transform units 301 as appropriate. Inverse Fourier transform units 305 include inverse Fourier transform units 305$_1$ to 305$_n$ so as to correspond to the AD conversion units 10$_1$ to 10$_n$. Note that, in a case where it is not necessary to distinguish the individual inverse Fourier transform units, the inverse Fourier transform units are collectively referred to as the inverse Fourier transform units 305 as appropriate.

In a similar manner to the configuration illustrated in FIG. 6, the configuration of the crosstalk reduction unit 30 illustrated in FIG. 8 is an example based on the assumption that, instead of directly inputting a signal to a neural network, short-term Fourier transform is used for transform into a spectrogram, the spectrogram is processed, and data thus obtained is input.

The short-term Fourier transform unit 301 transforms a signal into a complex spectrogram by applying a short-term Fourier transform (STFT) for each track.

The NN input data generation unit 302 transforms a complex spectrogram for each track into data that can be input to a neural network. A specific example of the processing performed by the NN input data generation unit 302 is, for example, the same as that of the NN input data generation unit 202. Note that, in a case where the input data for the neural network is the same in the main speech detection processing and the crosstalk reduction processing, the short-term Fourier transform unit and the NN input data generation unit may be commonalized.

The neural network unit 303 is a neural network trained in advance on the following correspondence relationships. Note that details of a training method and training data will be described later.

In a case where the input data contains a mixture of a main speech and crosstalk, the crosstalk is reduced and only the main speech is output.

In a case where the input data contains only a main speech, the main speech is output as it is.

In a case where the input data contains only crosstalk, silence is output.

In a case where the input data contains silence, silence is output.

The output of the neural network unit 303 may be, instead of a signal, data that can be transformed into a signal, such as a spectrogram. Alternatively, a time-frequency mask having an action of reducing crosstalk and retaining a main speech may be output, and the mask may be applied to a complex spectrogram in the subsequent processing.

The post-processing unit 304 transforms output data of the neural network unit 303 into a crosstalk reduction result for each track. The post-processing unit 304 performs, for example, the following processing.

In a case where the output data of the neural network unit 303 is an amplitude spectrogram, a phase of a complex spectrogram generated by the short-term Fourier transform unit 301 is applied to the amplitude spectrogram so that a complex spectrogram of the crosstalk reduction result is generated.

In a case where the output data of the neural network is a time-frequency mask, the mask is applied to a complex spectrogram generated by the short-term Fourier transform unit 301 so that a complex spectrogram of the crosstalk reduction result is generated.

Figure 9A:
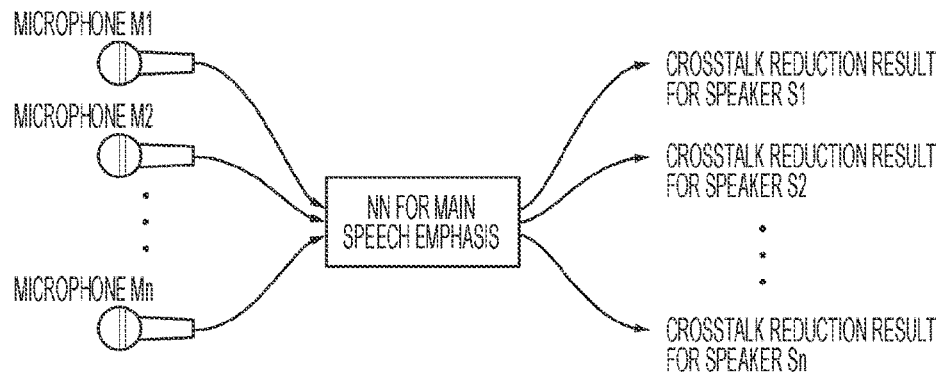
FIGS. 9A, 9B, and 9C are diagrams referred to in a description related to a neural network unit included in the crosstalk reduction unit according to the embodiment.
Figure 9B:
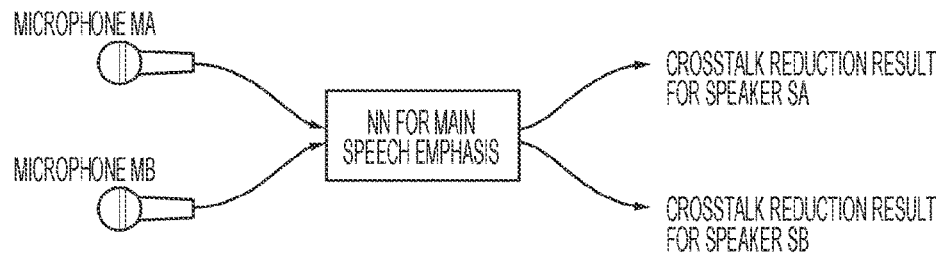
Figure 9C:
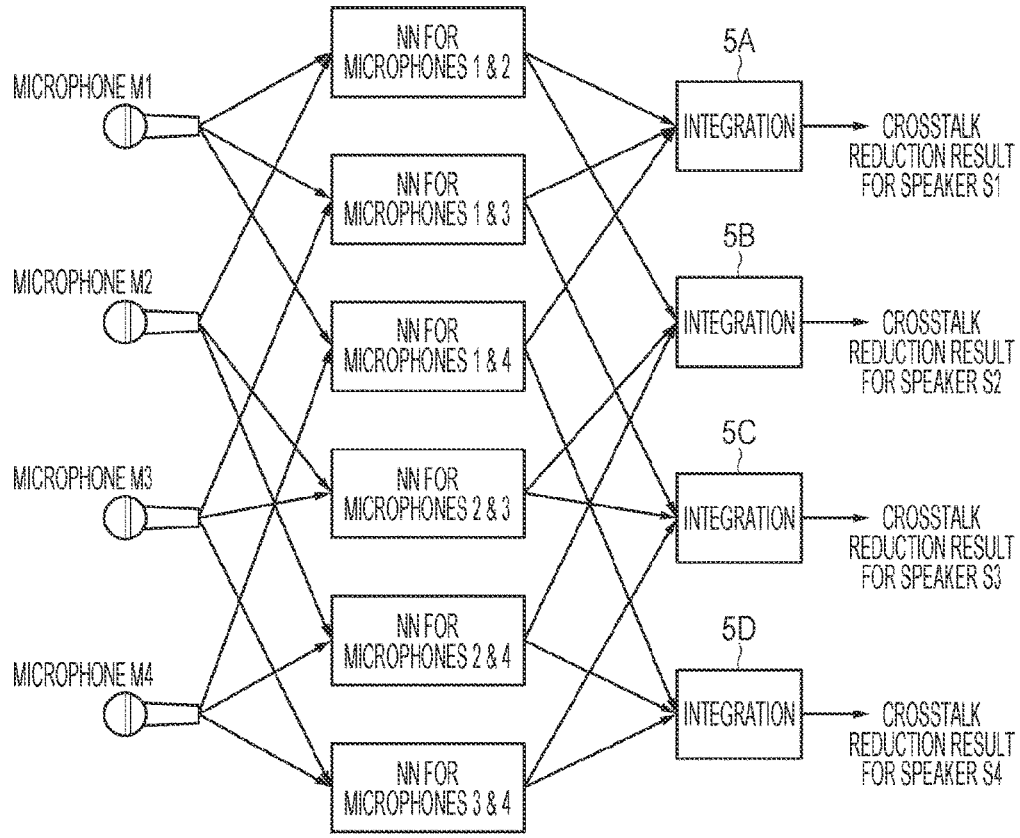

Integration processing illustrated in FIG. 9C described later is performed.

The inverse Fourier transform unit 305 applies short-time inverse Fourier transform to the complex spectrogram of the crosstalk reduction result for each track generated by the post-processing unit 304, and generates a signal of the crosstalk reduction result for each track.

Next, the neural network unit 303 will be described with reference to FIGS. 9A, 9B, and 9C. As a neural network for crosstalk reduction, it is possible to apply a neural network similar to the neural network for main speech detection illustrated in FIGS. 3A, 3B, and 3C, except that output data is a signal including only a clean main speech (not including crosstalk of another person).

As for the numbers of inputs and outputs, there are two ways that can be considered in a similar manner to the case of the neural network for main speech detection. An n-input/n-output neural network illustrated in FIG. 9A may be learned and used at the time of inference. On the other hand, a two-input/two-output neural network illustrated in FIG. 9B is learned. Then, as illustrated in FIG. 9C, at the time of inference, neural networks of the same number as the microphone pairs may be prepared (e.g., six neural networks), and integration modules 5A to 5D may integrate outputs of the corresponding neural networks for each of the microphones by a predetermined method, thereby generating a crosstalk reduction result for each microphone.

The following processing contents are exemplified as the processing performed by each integration module.

(Integration Method 1)

Each neural network outputs an amplitude spectrogram. Each integration module receives it and obtains one spectrogram by applying any of methods including maximum, minimum, average, and median.

(Integration Method 2)

Each neural network outputs a time-frequency mask. Each integration module receives it and obtains one mask by applying any of methods including maximum, minimum, average, and median. Then, in the subsequent processing, the mask is applied to a complex spectrogram derived from a microphone-recorded sound.

Next, a method of creating training data for reducing crosstalk will be described. The training data for crosstalk reduction includes a set of input data and teacher data. The input data may be the same as that for main speech detection, and is a signal in which zero or more and n or less speeches overlap. On the other hand, the teacher data is, unlike teacher data for detecting the main speech, silence or voice constituted by only a main speech (not including crosstalk of another person).

In a similar manner to the training of the neural network for main speech detection, in order to learn a two-input/two-output neural network, it is necessary to process training data prepared for learning an n-input/n-output neural network. This point will be described with reference to FIG. 10.

The recording environment assumed in FIG. 10 is the same as the recording environment illustrated in FIG. 4A. However, since a clean main speech voice in which crosstalk of another person is not mixed is required as the teacher data, the speeches are mixed on a computing machine.

The number of speakers is four (speakers 4A to 4D), the number of microphones is also four (microphones MA to MD). Two speakers are the speakers 4A and 4B, and the remaining speakers 4C and 4D are other speakers. In FIG. 10, the "speaker's state" and "input data" are the same as those in FIG. 4B. On the other hand, the "teacher data" is a clean main speech or silence.

For example, consideration will be given to a case where the speaker 4A and another speaker (one or both of the speaker 4C and the speaker 4D) are speaking. A signal (Ad+Oc) in which a main speech (Ad) of the speaker 4A and crosstalk (Oc) of the other speaker are mixed is input to the microphone MA. A signal (Ac+Oc) in which crosstalk (Ac) of the speaker 4A and crosstalk (Oc) of the other speaker are mixed is input to the microphone MB. In this case, (Ad) itself is desirable as a crosstalk reduction result for the speaker 4A, and thus (Ad) is designated as teacher data for the speaker 4A. On the other hand, since the speaker 4B is not speaking at all, silence is designated as teacher data for the speaker 4B. Note that, as data corresponding to silence, data having a value of completely zero may be used, or a sound in a quiet environment in which no one is speaking may be recorded so that the recorded signal can be used as silence data.

On the other hand, in a case where the speaker 4A and the speaker 4B are both speaking, (Ad) and (Bd) are designated as teacher data for the speaker 4A and teacher data for the speaker 4B, respectively, regardless of whether or not the other speakers are speaking.

[Operation Example of Signal Processing Device]

Figure 11:
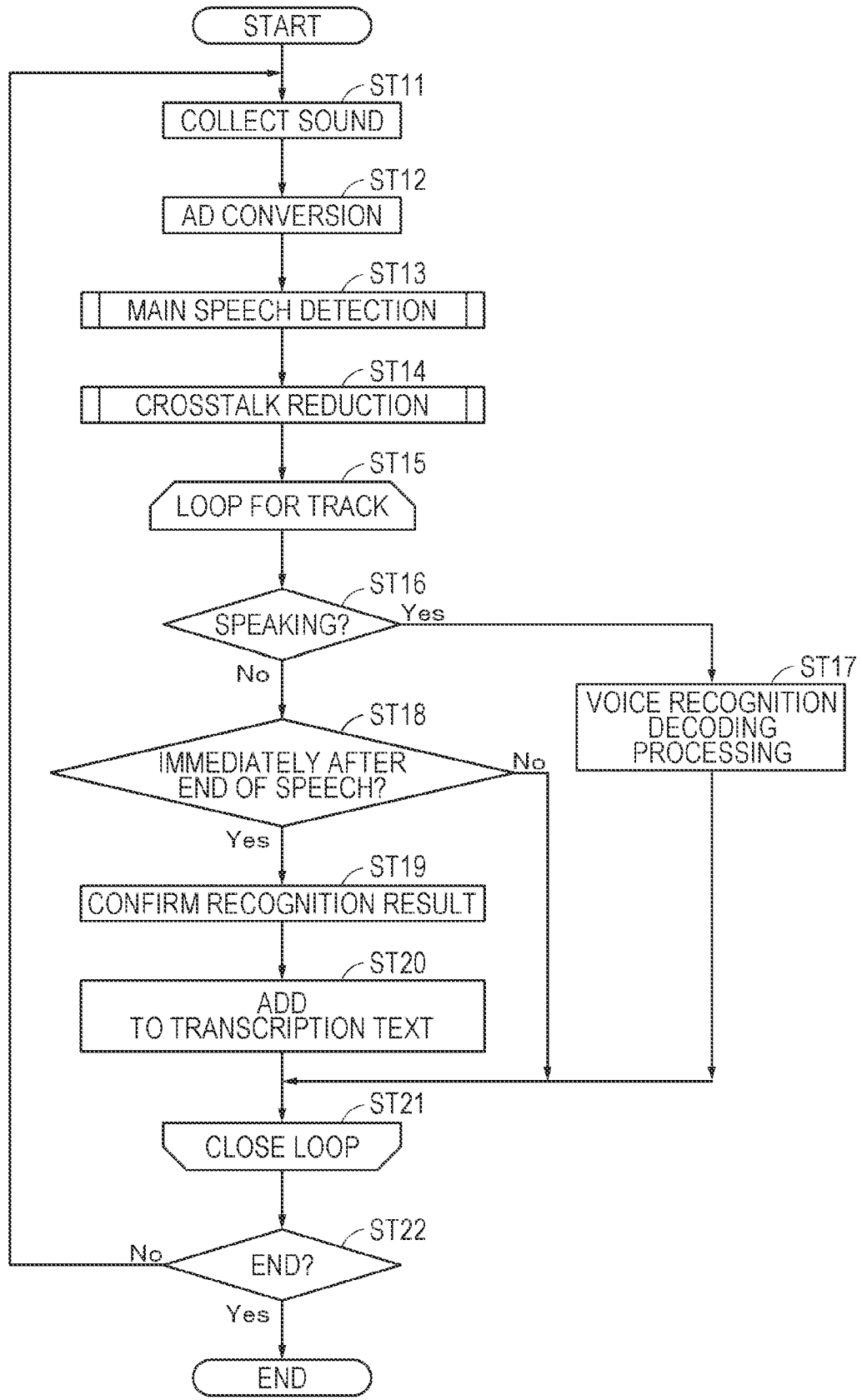
FIG. 11 is a flowchart referred to in a description related to an operation example of the signal processing device according to the embodiment.

Next, an operation example of the signal processing device 100 will be described with reference to the flowchart in FIG. 11. In the present embodiment, a mode is assumed in which each piece of processing including main speech detection, crosstalk reduction, and voice recognition is performed in synchronization, and the unit of synchronization in this case is, for example, a frame of short-term Fourier transform. Furthermore, the processing of steps ST11 to ST22 in FIG. 11 is a loop of processing executed as long as the system is operating.

When the processing is started, in step ST11, sound is collected by the microphone M worn by each speaker, and a signal is acquired. Then, the processing proceeds to step ST12.

In step ST12, the analog signal acquired by the microphone M is converted into a signal in digital form by the AD conversion unit 10. The length of the signal (the number of samples) acquired at one time is equal to a shift width in short-term Fourier transform described later. Then, the processing proceeds to step ST13.

In step ST13, the main speech detection unit 20 performs main speech detection processing. Then, the processing proceeds to step ST14.

In step ST14, the crosstalk reduction unit 30 performs crosstalk reduction processing. Note that the main speech detection processing and the crosstalk reduction processing may be performed in the illustrated order, may be performed in reverse order, or may be performed in parallel. Note that details of each piece of processing will be described later.

The processing from step ST15 to step ST21 is a loop of processing performed for each track. Since the results of the main speech detection processing and the crosstalk reduction processing that are output are the same in number as the microphones, that is, the output corresponds to a plurality of tracks, the processing from step ST16 to step ST22 is performed for each track. Since the processing of each track is independent, the pieces of processing for the corresponding tracks may be executed in time series, or may be executed in parallel.

In step ST16, the voice recognition unit 50 discriminates whether or not the speaker corresponding to the track is speaking on the basis of the result of the main speech detection. If the speaker is speaking, the processing proceeds to step ST17.

In step ST17, the voice recognition unit 50 performs voice recognition decoding processing (voice recognition processing). That is, a signal corresponding to one frame of the crosstalk reduction result for the track is sent to the voice recognition unit 50, and the voice recognition unit 50 updates a hypothesis of the recognition result.

On the other hand, if it is discriminated in the processing of step ST16 that the speaker is not speaking, the processing proceeds to step ST18. In step ST18, it is determined whether or not it is immediately after the end of the speech. Immediately after the end of the speech means a case in which the determination result of step ST16 has previously branched to step ST17, but the determination result of step ST16 branches to step ST18 this time. In a case where it is immediately after the end of the speech, the processing proceeds to step ST19. In a case where it is not immediately after the end of the speech, the processing proceeds to step ST21, which is the end of the loop for the track.

In step ST19, the voice recognition unit 50 confirms a recognition hypothesis. During decoding, there may be a plurality of recognition hypotheses (candidates for the recognition result) of the voice recognition decoding processing by the voice recognition unit 50, and the recognition result having the highest score of the voice recognition at this point of time is confirmed to be the voice recognition result corresponding to the speech. Then, the processing proceeds to step ST20.

In step ST20, the voice recognition result concatenation unit 60 performs, for example, a process such as rearranging the recognition results in the order in which the speeches have been made, using the start times and the end times of the speeches. Then, the text generation unit 80 generates text data on the basis of the processing result of the voice recognition result concatenation unit 60. Since each track and a speaker are associated with each other, a text in which speaker information (name and the like) deduced from the track number is combined with the voice recognition result may be generated.

In a case where the processing from step ST16 to step ST20 has been completed for all tracks, the processing proceeds to step ST22. In step ST22, it is determined whether to continue operating the system. In a case where the determination result indicates that the operation is to be ended, the operation is ended. In other cases, the processing returns to step ST11. The determination in step ST22 is performed by an appropriate functional block of the signal processing device 100.

Figure 12:
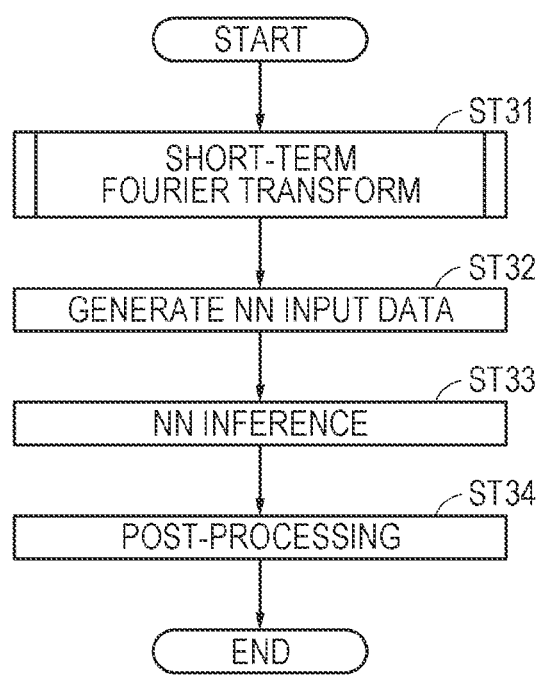
FIG. 12 is a flowchart referred to in a description related to a flow of main speech detection processing according to the embodiment.
Figure 13A:
FIGS. 13A, 13B, and 13C are diagrams referred to in a description related to processing performed by a short-term Fourier transform unit according to the embodiment.
Figure 13B:
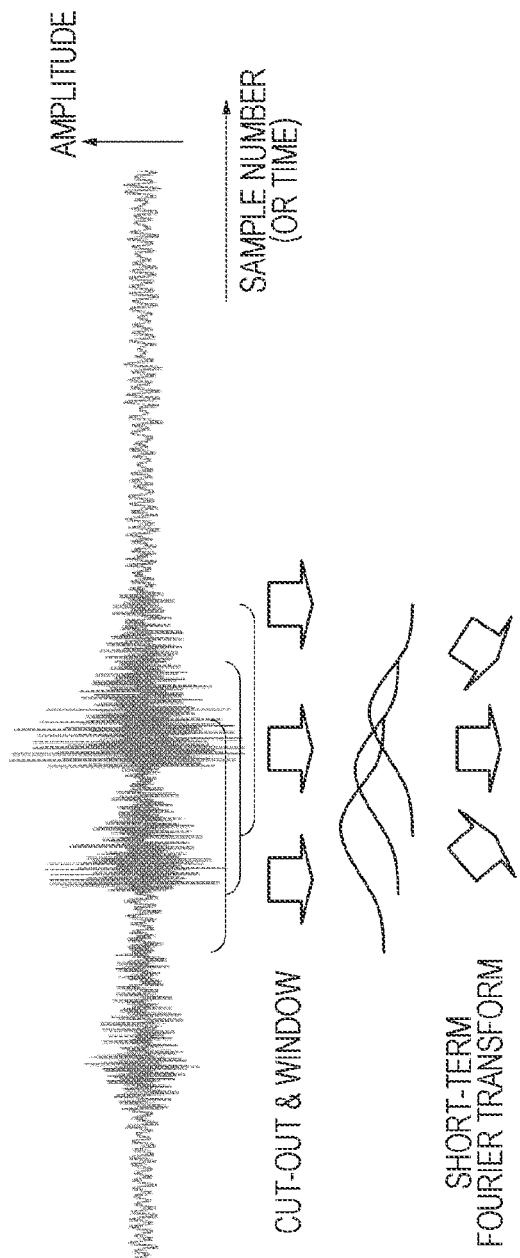
Figure 13C:
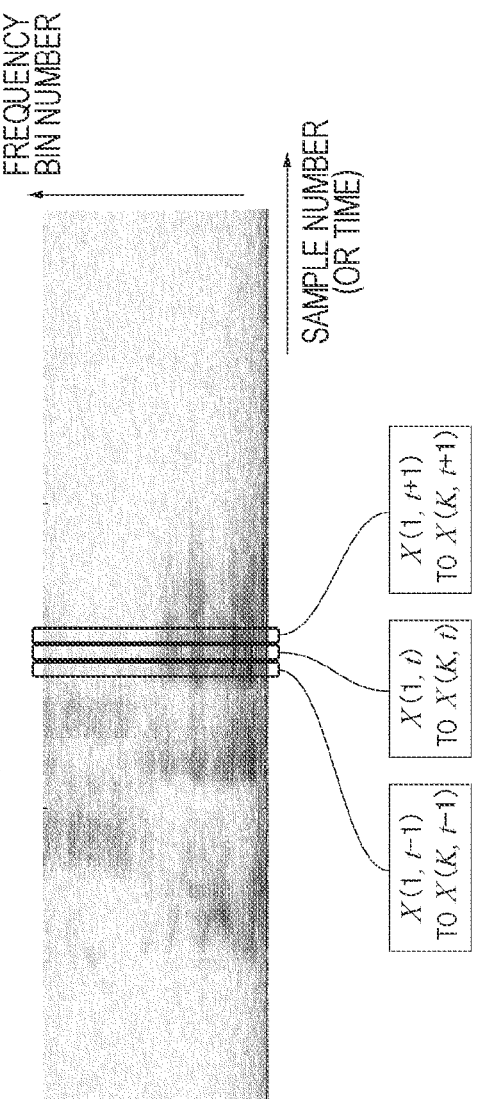

Next, details of the main speech detection processing will be described with reference to the flowchart illustrated in FIG. 12. In step ST31, the short-term Fourier transform units 201 perform short-term Fourier transform on the microphone-recorded sound of each track. In the short-term Fourier transform, as illustrated in FIGS. 13A, 13B, and 13C, pieces of a fixed length are cut out from a waveform (see FIG. 13A) of the microphone-recorded sound collected by the microphone M and converted into a digital form by the AD conversion unit 10, and a window function such as a Hanning window or a Hamming window is applied to those pieces of the fixed length (see FIG. 13B). This cut-out unit is referred to as a frame. By applying short-term Fourier transform to data for one frame, X(1, t) to X(K, t) are obtained as observation signals in a time-frequency domain (see FIG. 13C). Where t represents a frame number, and K represents the total number of frequency bins. The amount of movement of a frame per one time is referred to as a shift width. There may be an overlap between the cut-out frames, so that a change in the signal in the time-frequency domain becomes smooth between consecutive frames. X(1, t) to X(K, t), which are data for one frame, are referred to as spectra, and a data structure in which a plurality of spectra is arranged in the time direction is referred to as a spectrogram (FIG. 13C). In FIG. 13C, a horizontal axis and a vertical axis represent the frame number and the frequency bin number, respectively. In the example illustrated in FIG. 13C, each of three spectra is generated. After the processing of step ST31 has been performed, the processing proceeds to step ST32.

In step ST32, a complex spectrogram (or complex spectra for one frame) generated by short-term Fourier transform is transformed into input data for the neural network by the NN input data generation unit 202. Then, the processing proceeds to step ST33.

In step ST33, neural network inference is performed. The neural network inference is processing of generating output data by inputting the input data generated in step ST32 to the neural network, and performing layer-by-layer forward propagation. Then, the processing proceeds to step ST34.

In step ST34, the post-processing unit 204 performs post-processing. For example, the post-processing unit 204 performs processing of transforming the output data of the neural network into the form of a main speech detection result.

Figure 14:
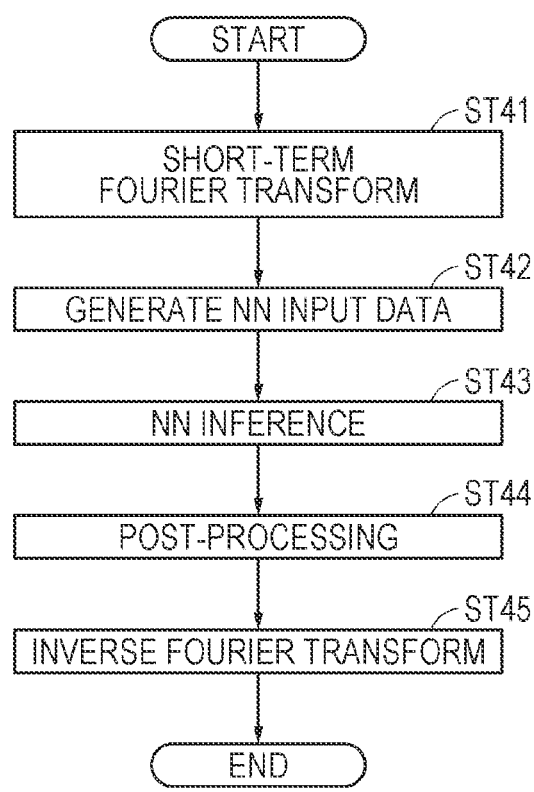
FIG. 14 is a flowchart referred to in a description related to a flow of crosstalk reduction processing according to the embodiment.

Next, details of the crosstalk reduction processing will be described with reference to the flowchart illustrated in FIG. 14. In the processing from step ST41 to step ST43, for example, processing similar to the processing from step ST31 to step ST33 described above is performed. Following the processing of step ST43, processing of step ST44 is performed.

In step ST44, the post-processing unit 304 transforms the output data of the neural network into a complex spectrogram corresponding to a crosstalk reduction result. The complex spectrogram is generated for each track. Then, the processing proceeds to step ST45.

In step ST45, the inverse Fourier transform unit 305 transforms the complex spectrogram of the crosstalk reduction result into a sound waveform. Note that, depending on the type of the voice feature amount used in the voice recognition, it is possible to omit the inverse Fourier transform, and output a complex spectrogram or an amplitude spectrogram to the voice recognition unit 50.

[Effects Obtained by Present Embodiment]

According to the present embodiment described above, for example, the following effects can be obtained.

The main speech detection processing, crosstalk reduction processing, voice recognition, and the like are performed on a signal recorded by a microphone assigned to each speaker, and text data can be automatically generated on the basis of the result thereof.

At a timing when speeches of a plurality of persons overlap, voice recognition results of the same number as the overlapping speeches are generated by the function of main speech detection corresponding to the overlapping speeches. Moreover, since crosstalk reduction is applied to each speech and crosstalk components are removed, the voice recognition can be performed with high accuracy also for overlapping speeches. That is, it is possible to generate correct recognition results also for overlapping speeches while satisfying the feature of the system 1 in FIG. 1A that a single recognition result is generated for a single speech.

The main speech detection processing according to the present embodiment uses the same technology to deal with both a single speech and overlapping speeches. Moreover, actual sound data is used for training. It is therefore possible to estimate a speech frame with high accuracy as compared with a case where determination results of a plurality of technologies are integrated on a rule basis.

The present embodiment uses actual voice data or the like for training, and can be applied without parameter adjustment in a variety of environments as long as the environment is covered by training data. Since parameter adjustment is not required, the present embodiment is also superior to the technology described in Document 4.

The present embodiment can improve precision of a generated transcription text (text data), and can therefore reduce labor required for manual modification.

MODIFIED EXAMPLES

Although the embodiment of the present disclosure has been specifically described above, contents of the present disclosure are not limited to the above-described embodiment, and various modifications may be made on the basis of the technical idea of the present disclosure. Note that, in the description of modified examples, the same or equivalent configurations in the above description are denoted by the same reference numerals, and redundant description is omitted as appropriate.

First Modified Example

A first modified example is a technology related to simultaneous inference of main speech detection and crosstalk reduction. The configuration example of the signal processing device 100 illustrated in FIG. 5 shows a mode in which the main speech detection processing and the crosstalk reduction processing are performed by different modules. In the present modified example, both are performed by a single module. Thus, sounds recorded by a plurality of microphones are input, a neural network that performs main speech detection and crosstalk reduction at the same time is learned, and the neural network is used at the time of inference.

Figure 15:
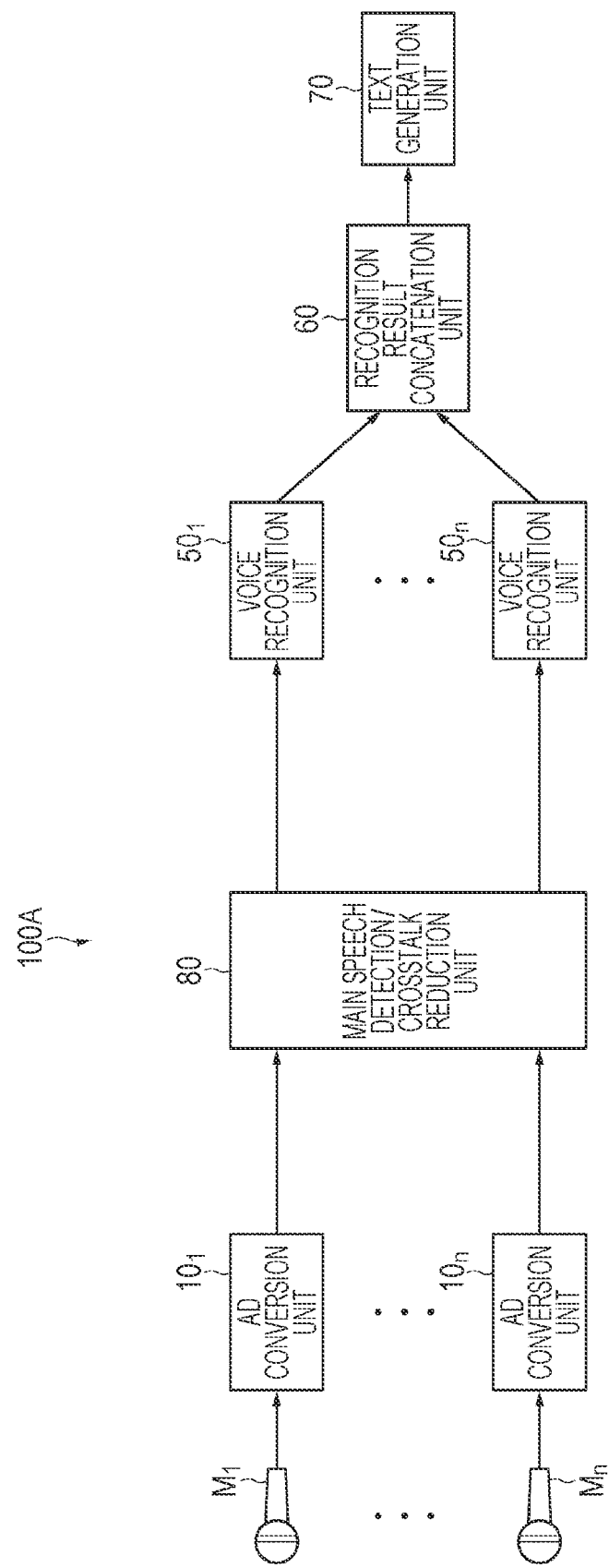
FIG. 15 is a diagram for illustrating a modified example.

FIG. 15 is a diagram for illustrating a configuration example of a signal processing device (signal processing device 100A) according to the present modified example. The signal processing device 100A is different from the signal processing device 100 in that the main speech detection unit and the crosstalk reduction unit are integrated to form a main speech detection/crosstalk reduction unit 80. The output of the main speech detection/crosstalk reduction unit 80 is the same as the output of the main speech detection unit 20 and the output of the crosstalk reduction unit 30.

Figure 16:
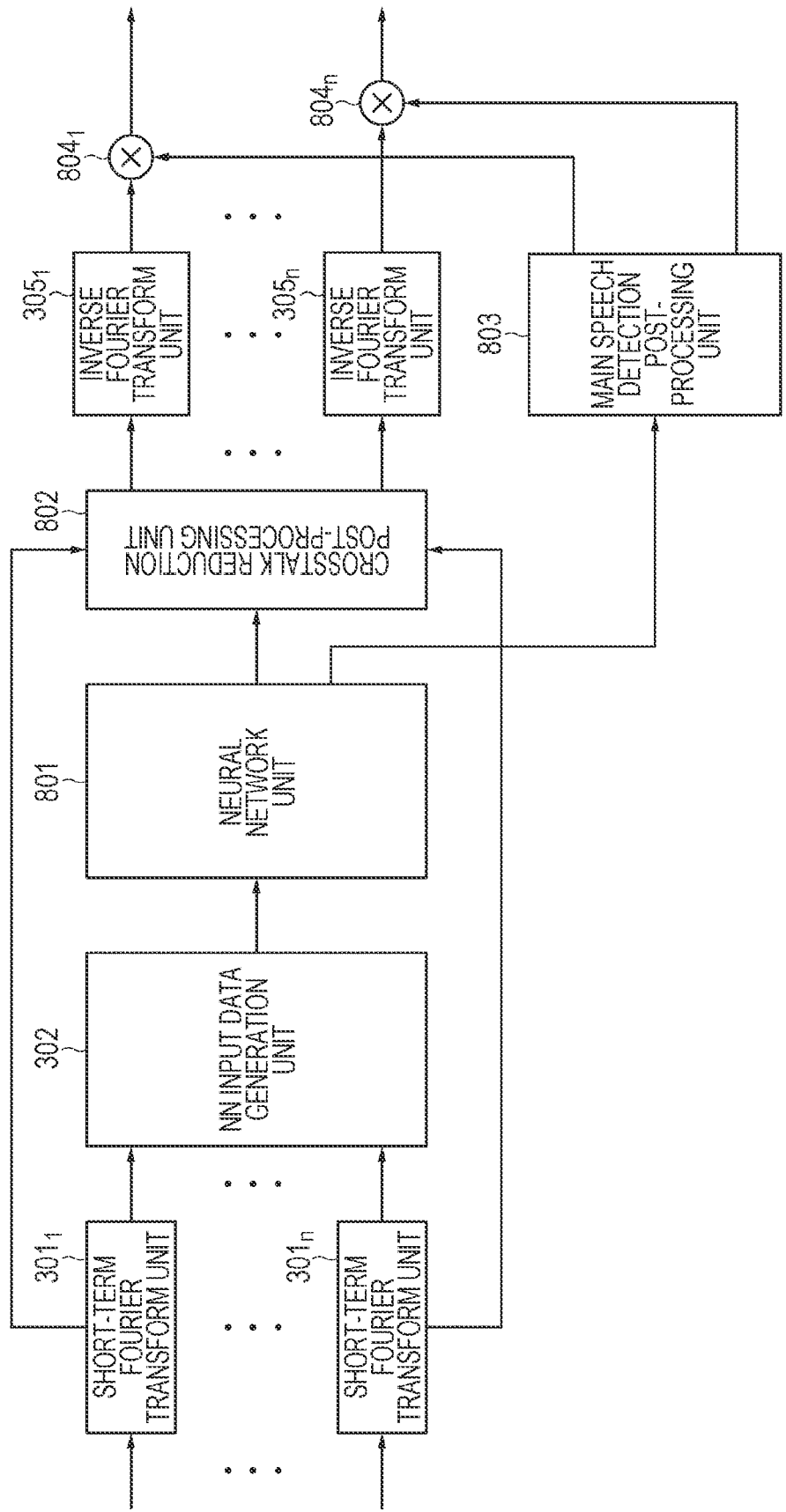
FIG. 16 is a diagram for illustrating the modified example.

FIG. 16 is a diagram for illustrating a configuration example of the main speech detection/crosstalk reduction unit 80. Schematically, the configuration of the main speech detection/crosstalk reduction unit 80 is a configuration in which the configuration of the main speech detection unit 20 illustrated in FIG. 6 and the configuration of the crosstalk reduction unit 30 are combined.

The short-term Fourier transform unit 301 and the NN input data generation unit 302 are as already described above. A neural network unit 801 has outputs of two systems. One is an output related to a crosstalk reduction result, and this output is sent to a crosstalk reduction post-processing unit 802. The other is an output related to main speech detection, and this output is sent to a main speech detection post-processing unit 803.

The function of the crosstalk reduction post-processing unit 802 is the same as that of the post-processing unit 304. The output of the crosstalk reduction post-processing unit 802 is sent to the inverse Fourier transform unit 305 in the subsequent stage, and is subjected to inverse Fourier transform. The processing performed by the inverse Fourier transform unit 305 is as already described above.

The function of the main speech detection post-processing unit 803 is the same as that of the post-processing unit 204. A multiplier 804 integrates a crosstalk reduction result and a main speech detection result, and has the same function as the multiplier 40.

Figure 17A:
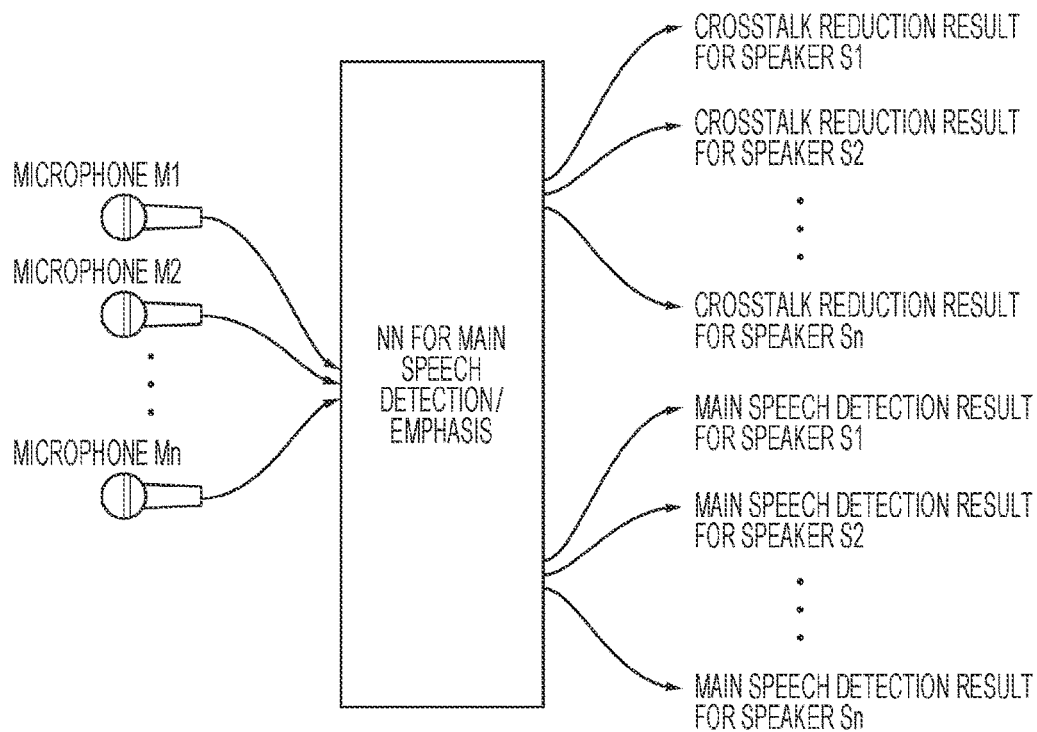
FIGS. 17A and 17B are diagrams for illustrating the modified example.
Figure 17B:
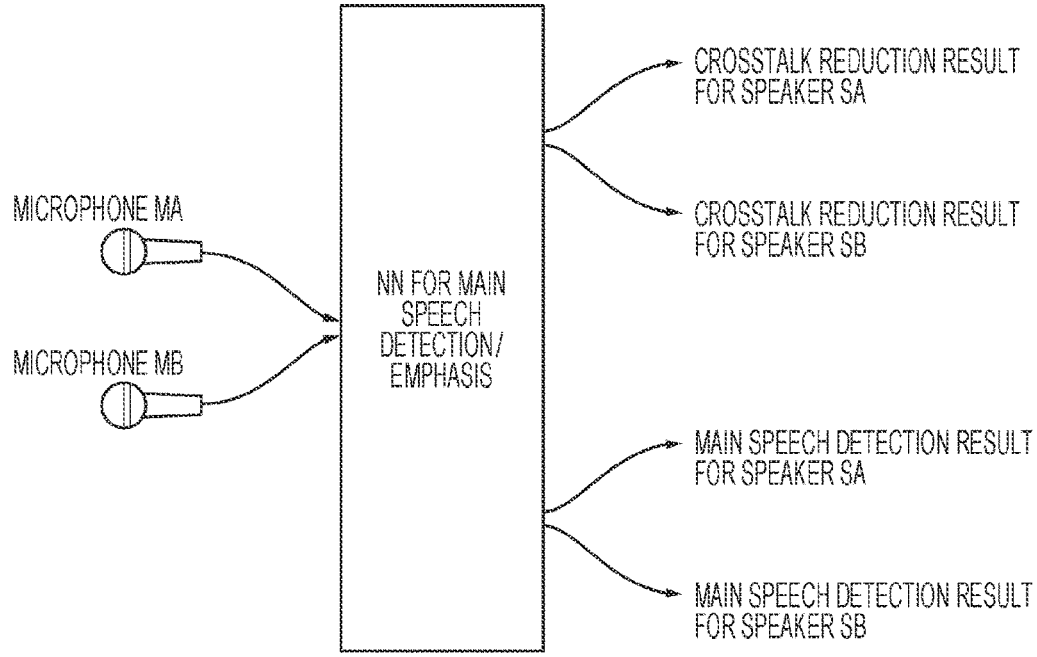

Training a single neural network to output a plurality of types of inference results (a main speech detection result and a crosstalk reduction result in the present modified example) is called multi-task learning. Examples of a neural network trained by multi-task learning are illustrated in FIGS. 17A and 17B. As a neural network, it is possible to use only one neural network of an n-input/2n-output type illustrated in FIG. 17A, and it is also possible to combine and use a required number of neural networks of a two-input/four-output type illustrated in FIG. 17B.

In the n-input/2n-output type, n of the outputs are related to crosstalk reduction results, and the remaining n outputs are related to main speech detection results. On the other hand, in the two-input/four-output type, two of the outputs are a crosstalk reduction result of the microphone MA and a crosstalk reduction result of the microphone MB, and the remaining two outputs are main speech detection results for signals recorded by the corresponding microphones. At the time of inference, crosstalk reduction results are subjected to integration processing similar to that of the integration module 5A and the like, and main speech detection results are subjected to integration processing similar to that of the integration module 3A and the like.

FIG. 18 is an example of training data for multi-task learning. This is generated by merging the training data for main speech detection illustrated in FIG. 4B and the training data for crosstalk reduction illustrated in FIG. 10. A neural network for multi-task learning has a plurality of types (here, two types) of output nodes. One of the output nodes is trained using "teacher data for main speech detection", and the other is trained using "teacher data for crosstalk reduction", so that a neural network that outputs inference results for both by one inference can be constructed.

An operation example of the signal processing device 100A is substantially similar to the flowchart illustrated in FIG. 10. The difference is that the main speech detection processing and the crosstalk reduction processing are integrated to form main speech detection/crosstalk reduction processing.

Second Modified Example

In the signal processing device 100 according to the embodiment, the main speech detection unit 20 and the crosstalk reduction unit 30 operate independently and in parallel. However, considering that the voice recognition performed in the subsequent stage is performed only for a frame detected as a main speech, it is not efficient to reduce crosstalk outside the main speech frame. Thus, the present modified example reduces a processing load by adopting a configuration in which crosstalk reduction is performed only for a signal of a frame detected as a main speech, that is, a frame that includes a main speech.

FIG. 19 is a diagram for illustrating a configuration example of a signal processing device (signal processing device 100B) according to the present modified example. The signal processing device 100B is different from the signal processing device 100 in terms of the configuration in that an input signal division unit 81 is included, that the output of the AD conversion unit 10 and the output of the main speech detection unit 20 are supplied to the input signal division unit 81, and that a crosstalk reduction unit is prepared for each track (that crosstalk reduction units $31_1$ to $31_n$ are included).

The operation of the input signal division unit 81 will be described with reference to FIGS. 20A and 20B. In the example illustrated in FIGS. 20A and 20B, in a similar manner to the example illustrated in FIGS. 2A and 2B, the microphone MA is assigned to a speaker S1, who is one of two speakers (speakers S1 and S2), and the microphone MB is assigned to the speaker S2. Then, it is assumed that the speaker S1 makes a speech first, the speaker S1 makes a speech again next, and then the speaker S2 starts to speak in the middle of the speech. It is assumed that each speech frame has been correctly detected by main speech detection processing, and the detected speech frames are a frame D1, a frame D2, and a frame E1.

The input signal division unit 81 divides microphone input signals for all tracks for each speech frame. For example, as for the frame D1, input signals of the same time range are cut out not only for the microphone MA corresponding to the speaker but also for the microphone MB. Then, the input signals for all the microphones and information regarding the frame D1 (track number, speech start time and end time, and the like) are included in a set SE1, and the set SE1 is sent to the crosstalk reduction unit $31_1$ corresponding to a track 1.

Similarly, also for the frames D2 and E1, the input signal division unit 81 generates sets such as sets SE2 and SE3, respectively, and outputs the sets to the crosstalk reduction units of the corresponding tracks.

The crosstalk reduction units 31 generate a crosstalk reduction result for each frame. For example, while the crosstalk reduction unit 30 has n inputs and n outputs (n is the number of microphones), the crosstalk reduction units 31 have n inputs and 1 output. That is, crosstalk reduction processing is performed only on a track in which a main speech has been detected.

In a case where the crosstalk reduction of the present modified example is performed by a neural network, an n-input/1-output neural network may be directly learned. Alternatively, (n−1) two-input/two-output neural networks illustrated in FIG. 3B may be combined. As an example of the latter, an example in which the number of microphones is four is illustrated in FIG. 21.

Figure 21:
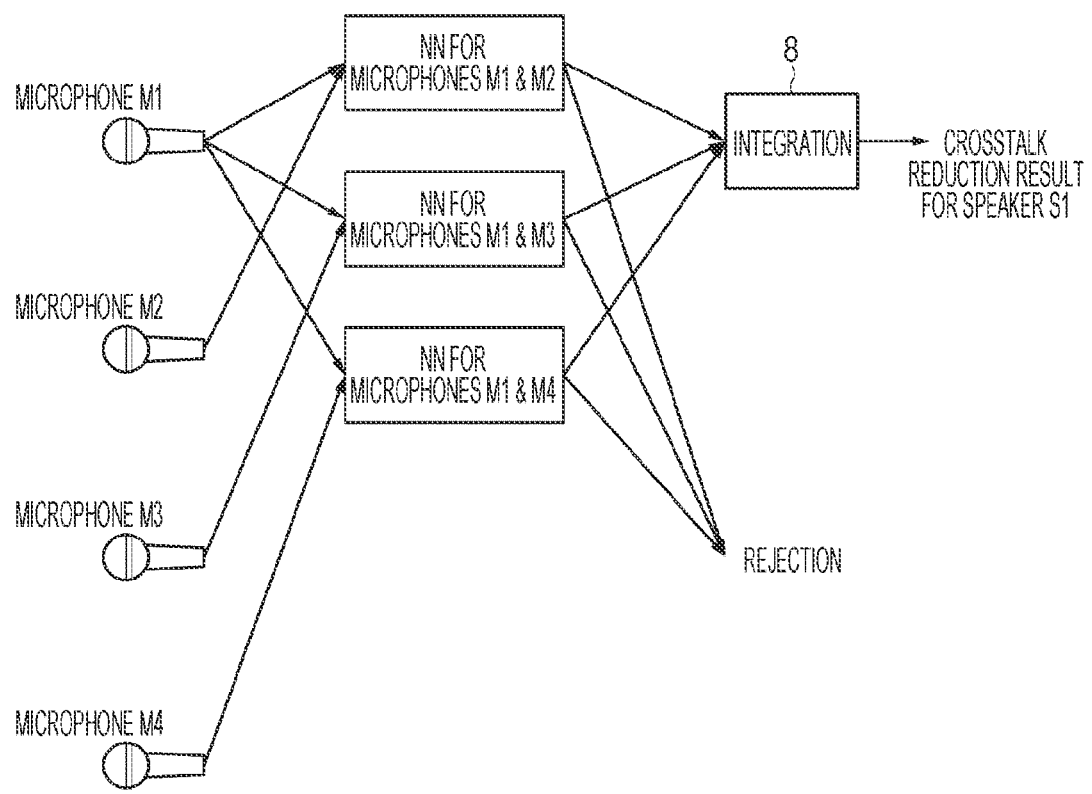
FIG. 21 is a diagram for illustrating the modified example.

In FIG. 21, it is assumed that crosstalk reduction is performed on a main speech of the speaker corresponding to the microphone M1. Since there are three ways the microphone M1 can be paired with one of the other microphones, three two-input/two-output neural networks are prepared, and input signals of the microphone pairs are input to the respective neural networks. One of the two outputs of each neural network is a crosstalk reduction result for the microphone M1, and the crosstalk reduction results are input to an integration module 8 so that a single crosstalk reduction result is obtained. The method of integration is similar to the method performed by the integration module 5A and the like. The other output is rejected because it is not related to the microphone M1.

Figure 22:
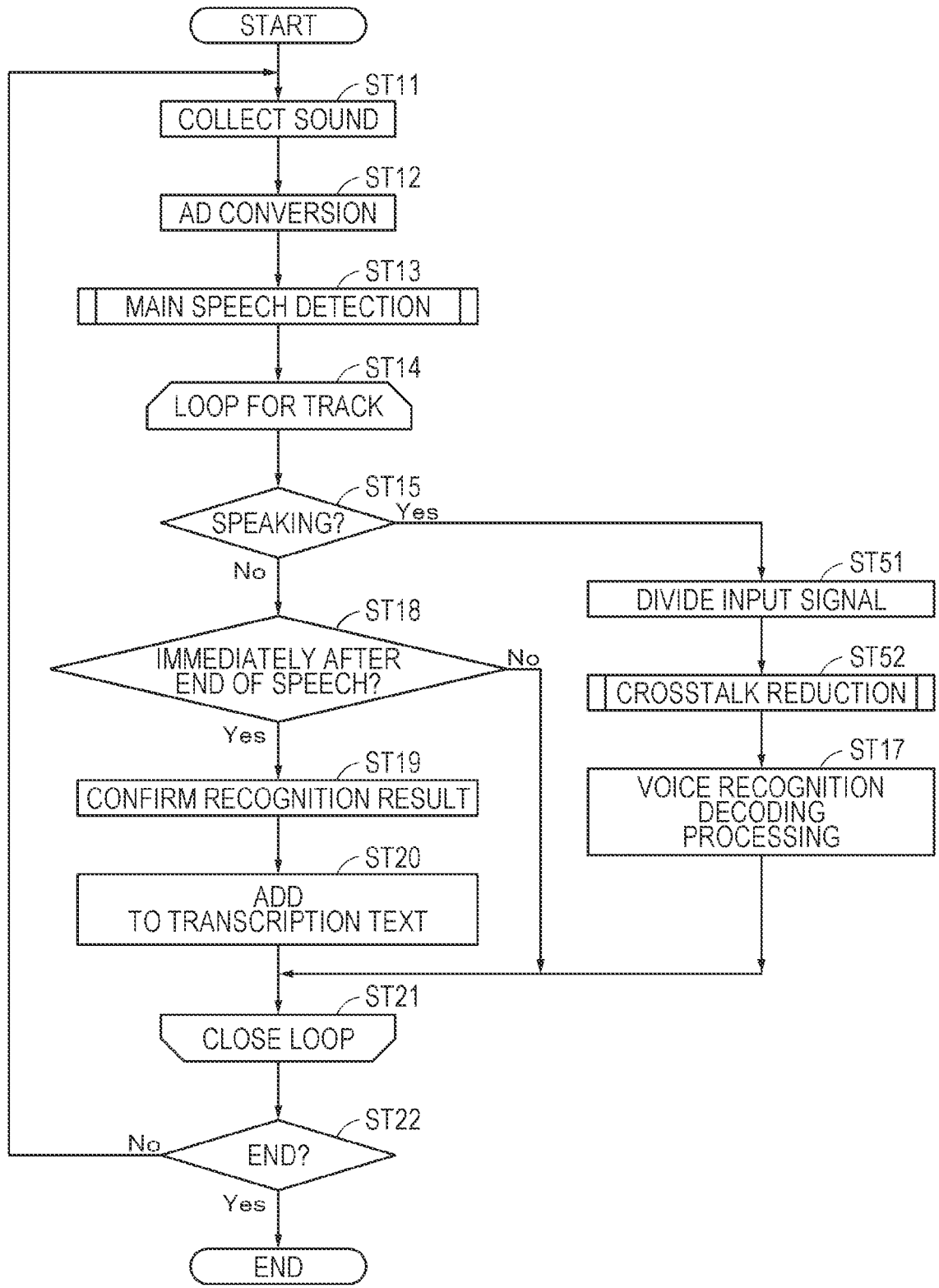
FIG. 22 is a flowchart for illustrating the modified example.

An operation example of the signal processing device 100B according to the present modified example will be described with reference to the flowchart illustrated in FIG. 22. Differences from the flowchart illustrated in FIG. 11 are that the input signal division unit 81 performs input signal division processing, and the crosstalk reduction processing is performed at a different timing. Hereinafter, an operation example of the signal processing device 100B will be described focusing on such differences.

In step ST15, it is discriminated whether or not the speaker corresponding to the track is speaking, from a result of main speech detection. If the speaker is speaking, the processing proceeds to step ST51. If the speaker is not speaking, the processing proceeds to step ST18.

In step ST51, the input signal division unit 81 performs input signal division processing. Since the contents of the input signal division processing have already been described with reference to FIGS. 20A and 20B, redundant description will be omitted as appropriate. Schematically, input signals of all the microphones and information regarding a main speech frame are included in a set, and the set is sent to the crosstalk reduction unit 31 of the corresponding track in the processing. Then, the processing proceeds to step ST52.

In step ST52, each of the crosstalk reduction units 31 generates a crosstalk reduction result for one track from the input signals of all the microphones. Since the subsequent processing such as voice recognition decoding processing is similar to that of the embodiment, redundant description is omitted.

Third Modified Example

Next, a third modified example will be described. The present modified example relates to a method for reducing the calculation amount in a case where there are three or more microphones. The processing according to the present modified example can be applied to both main speech detection processing and crosstalk reduction processing. In the following description, the main speech detection processing will be taken as an example.

In the embodiment described above, with reference to FIGS. 3A, 3B, and 3C, a method has been described in which a two-input/two-output neural network is learned, and then the neural networks of the same number as the microphone pairs are prepared at the time of inference, so that it is possible to support any number of microphones at the time of inference. However, there are about n×(n−1)/2 microphone pairs, and a calculation cost is substantially proportional to the square (n2) of the number of microphones. Thus, as the number of microphones increases, the processing load rapidly increases.

Regarding the crosstalk reduction processing, the calculation cost can be reduced by the above-described second modified example, but such a modified example cannot be applied to the main speech detection processing. Thus, in the present modified example, the calculation cost of the main speech detection processing is reduced to O(n) with the use of a virtual far-field microphone described below.

Figure 23:
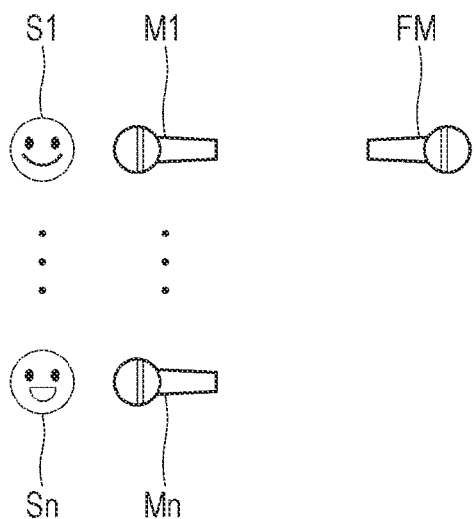
FIG. 23 is a diagram for illustrating a modified example.

A virtual far-field microphone will be described with reference to FIG. 23. In the example illustrated in FIG. 23, there are three or more speakers (S1 to Sn), and three or more microphones M1 to Mn are microphones assigned one to each speaker. Here, it is hypothesized that there is another microphone FM at a position away from any of the speakers. Hereinafter, such a microphone is referred to as the far-field microphone FM.

Since the far-field microphone FM is away from any of the speakers, all speeches are recorded as crosstalk. In a case where there is such a far-field microphone FM, it is possible to relatively easily determine whether or not a speech is a main speech. That is, a sound recorded by one of the microphones $M_1$ to $M_n$ assigned to the speaker is compared with a sound recorded by the far-field microphone FM. In a case where both are similar in terms of the volume, the degree of reverberation, and the like, the sound recorded by the microphone is either crosstalk or silence (background noise when no one is speaking), and is not a main speech in any case. On the other hand, in a case where the sound recorded by the microphone assigned to the speaker is clearer (the sound is louder and contains less reverberation) than the sound recorded by the far-field microphone, there is a high possibility that a main speech has been input.

In this determination method, since pairs of microphones are limited pairs in which the far-field microphone FM is paired with one of the other microphones, there are n pairs. Therefore, the calculation cost is O(n), and the calculation cost can be reduced as compared with O(n ^2), which is the calculation cost in the case of FIG. 3C.

In an actual recording environment, the far-field microphone FM generally does not exist. Thus, in the present modified example, it is necessary to generate a signal of a virtual far-field microphone from microphones assigned to speakers. A main speech detector based on this assumption will be described with reference to FIGS. 24A and 24B.

Figures 24A, 24B:
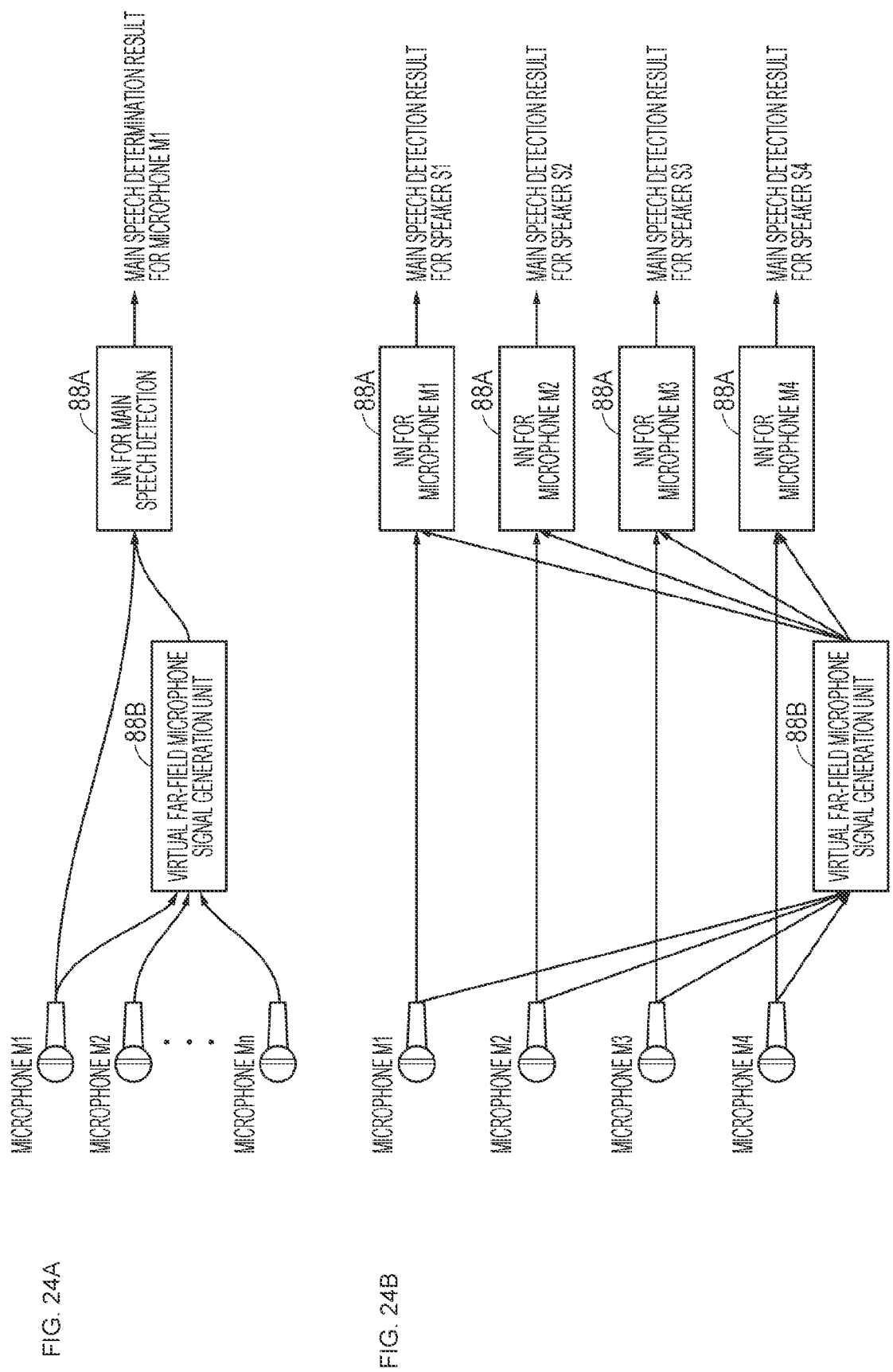
FIGS. 24A and 24B are diagrams for illustrating the modified example.

A detector 88A illustrated in FIGS. 24A and 24B is an n-input/1-output detector, and the output is a main speech detection result of a specific track (microphone). In an actual system configuration, as will be described later, a total of n main speech detectors, each of which corresponds to a track, are prepared and used as a main speech detection unit with n inputs and n outputs as a whole.

The microphone M1 is a microphone to be a target of main speech detection, and the microphones M2 to Mn are other microphones. A sound recorded by the microphone M1 is sent as it is (note that AD conversion or short-term Fourier transform may be performed) to one of the inputs of the main speech detection neural network 88A. On the other hand, all sounds recorded by the microphones are input to a virtual far-field microphone signal generation unit 88B, and the virtual far-field microphone signal generation unit 88B generates a signal of a virtual far-field microphone. The generated signal of the virtual far-field microphone is sent to another input of the main speech detection neural network 88A. The main speech detection neural network 88A performs inference by using two types of input data, and obtains a main speech detection result corresponding to the microphone M1.

As a method by which the virtual far-field microphone signal generation unit 88B generates a signal of a virtual far-field microphone, a plurality of methods described below can be exemplified.
 a) Each microphone-recorded sound is transformed into an amplitude spectrogram, and a minimum value is obtained between microphones at each temporal frequency.
 b) Recorded sounds are averaged among all microphones.
 c) This is a modification of b) described above, in which recorded sounds are averaged among microphones (microphones M2 to Mn in FIG. 24A) that are not to be targets of main speech detection.

A supplementary description will be given for the method a) described above. In a case where at least one of n persons is not speaking at a certain timing, the microphone assigned to that person collects only crosstalk, and that microphone can be used as a virtual far-field microphone. In a case where a main speech of one microphone and crosstalk of another microphone are derived from the same speech of the same speaker, it can be hypothesized that the crosstalk has a lower volume than the main speech. There is therefore a high possibility that a spectrogram obtained by adopting a minimum value among the microphones at each temporal frequency of an amplitude spectrogram is constituted only by the components of the crosstalk.

A supplementary description will be given also for the method b) and the method c) described above. In a case where it can be hypothesized that a relatively small number of speakers out of n speakers are speaking at the same time, it is possible to generate a signal relatively close to crosstalk by averaging recorded sounds among the microphones. Moreover, by excluding the microphone to be a target of main speech detection (in the example illustrated in FIGS. 24A and 24B, the microphone M1) from the average, it is possible to generate a signal close to crosstalk regardless of whether or not the speaker corresponding to the microphone M1 is speaking.

FIG. 24B illustrates an example in which the main speech detection neural networks 88A of the same number as the microphones are prepared to constitute a main speech detector with n inputs and n outputs, and illustrates an example of n=4. Since the virtual far-field microphone signal generation unit 88B can be shared, only one virtual far-field microphone signal generation unit is prepared, and the output thereof is sent to each neural network.

Fourth Modified Example

The present modified example relates to a method of displaying, in an easily viewable manner, a recognition result of a voice recorded in an environment in which there is a possibility that speeches of a plurality of speakers overlap.

In the present disclosure, a system that automatically or semi-automatically generates a transcription text of a conference, a broadcast program, or the like is assumed as one mode. In the transcription text, it is desirable that recognition results corresponding to speeches of the corresponding speakers be presented in the order of the remarks.

When concatenating voice recognition results generated for each track, the recognition result concatenation unit 60 according to the embodiment rearranges the voice recognition results in order of time by using the start time and the end time of each speech. However, in a case where there is an overlap between speeches, the order of recognition results arranged in accordance with the start time or the end time may be different from the order of the speeches.

Specifically, the following conversation is conceivable. Note that Hanako and Taro are names of speakers.
 (Hanako) "It was raining heavily earlier."
 (Taro) "Really?"
 (Hanako) "But the rain stopped while I was looking for an umbrella."
 Note that, in the conversation described above, it is assumed that the remark of Taro has been made in response to Hanako's remark "It was raining heavily". In this case, the order of description described above is appropriate as a transcription text.

However, for example, in a case where Hanako has made the first and second speeches with almost no interval between them, almost the entire speech of Taro overlaps with the speeches of Hanako. In the main speech detection according to the present disclosure, even in a case where speeches of two persons overlap as described above, each of the speeches can be detected as a different speech frame, but there is a high possibility that Hanako's speeches are detected as one long frame. In a case where crosstalk reduction and voice recognition are performed for each frame, and the recognition results are arranged in order of speech start time, the following transcription text is generated.

(Hanako) "It was raining heavily earlier, but the rain stopped while I was looking for an umbrella."

(Taro) "Really?"

In the transcription text described above, although the voice recognition results themselves are correct, the remark of Taro looks as if the remark has been made in response to "the rain stopped", and the nuances of the conversation have changed.

The cause of this problem is that the length of the frame detected by the main speech detection does not necessarily match the unit described as one speech in the transcription text. In a speech detection technology that supports overlapping speeches, there is a stronger tendency for such a problem to occur.

Thus, as a method of coping with such a problem, the present modified example adopts scroll display of speech frames and recognition results, for example.

FIG. 25 illustrates an example of the scroll display. In FIG. 25, a display unit 91 having a rectangular shape is illustrated. The display unit 91 may be integrated with the signal processing device 100 or the like, or may be a separate body. Alternatively, the display unit 91 may have a form of a partial area (window or the like) in a display device (display or the like). The display unit 91 displays names 92 of speakers. Specifically, "Hanako", which is a name 92A, and "Taro", which is a name 92B, are displayed on the display unit 91. In a case where the names of the speakers can be estimated from the track numbers, the names 92 of the speakers are displayed as described above. In a case where the names of the speakers are unknown, "speaker A", "speaker B", or the like may be displayed.

A dotted line L1 is displayed on the right side of "Hanako", which is the name 92A, and a dotted line L2 is displayed on the right side of "Taro", which is the name 92B. The line L1 and the line L2 represent the corresponding tracks, and the horizontal direction represents time. Speech frames and recognition results described later scroll along these lines. Note that, instead of the dotted lines, rectangular areas having a predetermined height may be displayed, and speech frames and recognition results may be superimposed and displayed inside the rectangular areas.

A solid line L3 displayed so as to be superimposed on the line L1 and a solid line L4 displayed so as to be superimposed on the line L2 are main speech frames of the corresponding tracks. The left end of each of the line L3 and the line L4 represents the starting end of the speech, and the right end represents the terminal end. In FIG. 25, it is assumed that the speech of "Hanako" is detected as one long frame, and the speech of "Taro" is detected as a frame that entirely overlaps with Hanako.

A voice recognition result 93A corresponding to a speech frame is displayed above the line L3, and a voice recognition result 93B corresponding to a speech frame is displayed above the line L4. It is desirable that the voice recognition result be displayed in association with the speech frame. Instead of being displayed above the displayed frame as illustrated in FIG. 25, the voice recognition result may be displayed so as to be superimposed on the displayed frame. It is desirable to display the voice recognition result so as to be the same in length as the speech frame by adjusting a font size, character spacing, and the like.

The displayed speech frame and the voice recognition result are scrolled automatically or manually while maintaining a correspondence relationship. Automatic scrolling is, for example, as follows.

a) A live (not recorded) speech is processed in real time, and a frame and a voice recognition result are scrolled in synchronization with the speech.

b) A previously recorded signal is processed, and a frame and a recognition result are scrolled in synchronization with reproduction of the recorded signal.

On the other hand, manual scrolling means that, for example, a horizontally long screen constituted by processing results (e.g., in a case of a one-hour program, speech frames and recognition results for one hour) for the whole recorded signals is created, and a user selectively displays a part of the screen by using a slide bar or the like.

In a case where a frame and a recognition result are displayed together as described above, the timing each speech has occurred in overlapping speeches becomes clearer. In other words, it becomes easier to grasp in reaction to which part of the immediately preceding speech each remark has been made.

For example, in the display example illustrated in FIG. 25, since it can be seen that the speech of "Taro" starts in the middle of "It was raining heavily", which is a speech of "Hanako", it can be seen that the remark of "Taro" has been made in response to "It was raining heavily", not "the rain stopped".

Other Modified Examples

The configurations, methods, steps, shapes, materials, numerical values, and the like described in the above-described embodiment and modified examples are merely examples, and configurations, methods, steps, shapes, materials, numerical values, and the like different from those described above may be used as necessary, or may be replaced with known ones. Furthermore, the configurations, methods, steps, shapes, materials, numerical values, and the like in the embodiment and the modified examples can be combined with each other within a range in which no technical contradiction occurs.

Note that the contents of the present disclosure are not to be construed as being limited by the effects exemplified in the present specification.

The present disclosure can also adopt the following configurations.

(1)

A signal processing device including:

a main speech detection unit configured to detect, by using a neural network, whether or not a signal input to a sound collection device assigned to each of at least two speakers includes a main speech that is a voice of the corresponding speaker, and output frame information indicating presence or absence of the main speech.

(2)

The signal processing device according to (1), in which the main speech detection unit detects whether or not the signal includes the main speech even in a case where a voice of a speaker other than the corresponding speaker is included.

(3)

The signal processing device according to (1) or (2), in which the main speech detection unit outputs time information of a frame that includes the main speech.

(4)

The signal processing device according to any one of (1) to (4), in which the main speech detection unit detects whether or not a signal input to a sound collection device assigned to each of three or more speakers includes a main speech that is a signal of the corresponding speaker on the basis of results of detection by a plurality of neural networks.

(5)

The signal processing device according to (4), in which the main speech detection unit detects whether or not the signal includes a main speech that is a signal of the corresponding speaker by integrating the results of detection by the plurality of neural networks.

(6)

The signal processing device according to any one of (1) to (5), further including:
a crosstalk reduction unit configured to reduce components of voices of speakers other than the corresponding speaker included in the signal.

(7)

The signal processing device according to (6), in which the frame information output from the main speech detection unit is applied to a signal output from the crosstalk reduction unit.

(8)

The signal processing device according to (6) or (7), in which the crosstalk reduction unit performs processing on a signal of a frame that includes the main speech.

(9)

The signal processing device according to any one of (1) to (9), further including:
a voice recognition unit configured to perform voice recognition on a signal to which the frame information output from the main speech detection unit is applied.

(10)

The signal processing device according to (9), further including:
a text information generation unit configured to generate text information based on a result of recognition by the voice recognition unit.

(11)

A signal processing method including:
detecting, by a main speech detection unit, by using a neural network, whether or not a signal input to a sound collection device assigned to each of at least two speakers includes a main speech that is a signal of the corresponding speaker, and outputting frame information indicating presence or absence of the main speech.

(12)

A program for causing a computer to execute a signal processing method including:
detecting, by a main speech detection unit, by using a neural network, whether or not a signal input to a sound collection device assigned to each of at least two speakers includes a main speech that is a signal of the corresponding speaker, and outputting frame information indicating presence or absence of the main speech.

(13)

A signal processing system including:
a plurality of sound collection devices, each of which is assigned to one of speakers; and
a signal processing device including a main speech detection unit configured to detect, by using a neural network, whether or not a signal input to each sound collection device includes a main speech that is a voice of the corresponding speaker, and output frame information indicating presence or absence of the main speech.

(14)

The signal processing system according to (13), in which each one of the plurality of sound collection devices is a microphone that is capable of being worn by the corresponding speaker or has directivity.

REFERENCE SIGNS LIST

20 Main speech detection unit
30 Crosstalk reduction unit
50 Voice recognition unit
70 Text generation unit
100 Signal processing device

The invention claimed is:

1. A signal processing device, comprising:
a main speech detection unit configured to:
receive a first signal from a first sound collection device, a second signal from a second sound collection device, and a third signal from a third sound collection device, wherein
the first sound collection device is associated with a first speaker,
the second sound collection device is associated with a second speaker, and
the third sound collection device is associated with a third speaker;
input, to a first neural network, the first signal and the second signal to obtain first information;
input, to a second neural network, the first signal and the third signal to obtain second information;
input, to a third neural network, the second signal and the third signal to obtain third information;
detect, by integration of the first information and the second information, a presence or an absence of a main speech of the first speaker in the first signal;
output first frame information indicating the presence or the absence of the main speech of the first speaker in the first signal;
detect, by integration of the first information and the third information, a presence or an absence of a main speech of the second speaker in the second signal;
output second frame information indicating the presence or the absence of the main speech of the second speaker in the second signal;
detect, by integration of the second information and the third information, a presence or an absence of a main speech of the third speaker in the third signal; and
output third frame information indicating the presence or the absence of the main speech of the third speaker in the third signal.

2. The signal processing device according to claim 1, wherein the main speech detection unit is further configured to detect the presence or the absence of the main speech of the first speaker in the first signal, in a case where the main speech of the second speaker is included in the first signal.

3. The signal processing device according to claim 1, wherein the main speech detection unit is further configured to output time information of a frame that includes the main speech of the first speaker.

4. The signal processing device according to claim 1, further comprising a crosstalk reduction unit configured to reduce the main speech of the second speaker included in the first signal.

5. The signal processing device according to claim 4, wherein the crosstalk reduction unit is further configured to reduce, based on the first frame information output from the main speech detection unit, the main speech of the second speaker included in the first signal.

6. The signal processing device according to claim 4, wherein the crosstalk reduction unit is further configured to perform a process on a specific signal of a frame that includes the main speech of the first speaker.

7. The signal processing device according to claim 1, further comprising a voice recognition unit configured to perform a voice recognition process on a specific signal, wherein the specific signal is based on the first frame information.

8. The signal processing device according to claim 7, further comprising a text information generation unit configured to generate text information based on a result of the voice recognition process.

9. A signal processing method, comprising:
in a signal processing device:
receiving a first signal from a first sound collection device, a second signal from a second sound collection device, and a third signal from a third sound collection device, wherein
the first sound collection device is associated with a first speaker,
the second sound collection device is associated with a second speaker, and
the third sound collection device is associated with a third speaker;
inputting, to a first neural network, the first signal and the second signal to obtain first information;
inputting, to a second neural network, the first signal and the third signal to obtain second information;
inputting, to a third neural network, the second signal and the third signal to obtain third information;
detecting, by integrating the first information and the second information, a presence or an absence of a main speech of the first speaker in the first signal;
outputting first frame information indicating the presence or the absence of the main speech of the first speaker in the first signal;
detecting, by integrating the first information and the third information, a presence or an absence of a main speech of the second speaker in the second signal;
outputting second frame information indicating the presence or the absence of the main speech of the second speaker in the second signal;
detecting, by integrating the second information and the third information, a presence or an absence of a main speech of the third speaker in the third signal; and
outputting third frame information indicating the presence or the absence of the main speech of the third speaker in the third signal.

10. A non-transitory computer-readable medium having stored thereon computer-executable instructions which, when executed by a computer, cause the computer to execute operations, the operations comprising:
receiving a first signal from a first sound collection device, a second signal from a second sound collection device, and a third signal from a third sound collection device, wherein
the first sound collection device is associated with a first speaker,
the second sound collection device is associated with a second speaker, and
the third sound collection device is associated with a third speaker;
inputting, to a first neural network, the first signal and the second signal to obtain first information;
inputting, to a second neural network, the first signal and the third signal to obtain second information;
inputting, to a third neural network, the second signal and the third signal to obtain third information;
detecting, by integrating the first information and the second information, a presence or an absence of a main speech of the first speaker in the first signal;
outputting first frame information indicating the presence or the absence of the main speech of the first speaker in the first signal;
detecting, by integrating the first information and the third information, a presence or an absence of a main speech of the second speaker in the second signal;
outputting second frame information indicating the presence or the absence of the main speech of the second speaker in the second signal;
detecting, by integrating the second information and the third information, a presence or an absence of a main speech of the third speaker in the third signal; and
outputting third frame information indicating the presence or the absence of the main speech of the third speaker in the third signal.

11. A signal processing system, comprising:
a plurality of sound collection devices, wherein
a first sound collection device of the plurality of sound collection devices is associated with a first speaker,
a second sound collection device of the plurality of sound collection devices is associated with a second speaker, and
a third sound collection device of the plurality of sound collection devices is associated with a third speaker; and
a signal processing device including a main speech detection unit, wherein the main speech detection unit is configured to:
receive a first signal from the first sound collection device, a second signal from the second sound collection device, and a third signal from the third sound collection device;
input, to a first neural network, the first signal and the second signal to obtain first information;
input, to a second neural network, the first signal and the third signal to obtain second information;
input, to a third neural network, the second signal and the third signal to obtain third information;
detect, by integration of the first information and the second information, a presence or an absence of a main speech of the first speaker in the first;
output first frame information indicating the presence or the absence of the main speech of the first speaker in the first signal;

detect, by integration of the first information and the third information, a presence or an absence of a main speech of the second speaker in the second signal;
output second frame information indicating the presence or the absence of the main speech of the second speaker in the second signal;
detect, by integration of the second information and the third information, a presence or an absence of a main speech of the third speaker in the third signal; and
output third frame information indicating the presence or the absence of the main speech of the third speaker in the third signal.

12. The signal processing system according to claim 11, wherein
each of the plurality of sound collection devices includes a microphone, and
the first sound collection device is one of wearable by the first speaker or has directivity.

* * * * *